United States Patent
Sutou et al.

(10) Patent No.: US 10,075,544 B2
(45) Date of Patent: Sep. 11, 2018

(54) INFORMATION PROCESSING APPARATUS AND INFORMATION PROCESSING METHOD

(71) Applicant: SONY CORPORATION, Tokyo (JP)

(72) Inventors: Yasuhiro Sutou, Tokyo (JP); Hiroaki Kitano, Saitama (JP); Shotaro Hori, Tokyo (JP); Taiji Ito, Kanagawa (JP); Tetsu Natsume, Chiba (JP); Koichi Oshima, Tokyo (JP); Hironari Mizumura, Kanagawa (JP); Yoshihiro Takagi, Tokyo (JP); Yasuo Sakuma, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 291 days.

(21) Appl. No.: 14/785,276

(22) PCT Filed: Feb. 25, 2014

(86) PCT No.: PCT/JP2014/054573
§ 371 (c)(1),
(2) Date: Oct. 16, 2015

(87) PCT Pub. No.: WO2014/178219
PCT Pub. Date: Nov. 6, 2014

(65) Prior Publication Data
US 2016/0112524 A1  Apr. 21, 2016

(30) Foreign Application Priority Data

Apr. 30, 2013 (JP) .................................. 2013-095688
Jul. 17, 2013 (JP) .................................. 2013-148532

(51) Int. Cl.
*G06F 15/16* (2006.01)
*H04L 29/08* (2006.01)
(Continued)

(52) U.S. Cl.
CPC .............. *H04L 67/22* (2013.01); *G06F 13/00* (2013.01); *G06Q 50/01* (2013.01); *H04L 51/32* (2013.01);
(Continued)

(58) Field of Classification Search
CPC ......... G06Q 50/01; H04L 51/32; H04L 51/06; H04L 51/063; H04L 67/22; H04N 21/44222; H04N 21/4622; H04N 21/84
(Continued)

(56) References Cited

U.S. PATENT DOCUMENTS 9,008,491 B2 * 4/2015 Kulas ................... H04N 21/443
386/239
2003/0093790 A1 * 5/2003 Logan ............... G06F 17/30265
725/38
(Continued)

FOREIGN PATENT DOCUMENTS

JP    2002-251311 A    9/2002
JP    2003-283981 A    10/2003
(Continued)

OTHER PUBLICATIONS

Extended European Search Report of EP Patent Application No. 14791027.7, dated Nov. 21, 2016, 7 pages.

*Primary Examiner* — Davoud Aman Zand
*Assistant Examiner* — Adam A Cooney
(74) *Attorney, Agent, or Firm* — Oblon, McClelland, Maier & Neustadt, L.L.P.

(57) ABSTRACT

[Object] To associate information generated on the basis of an activity that is carried out by a user with respect to a content with the content, thereby effectively using the information.
[Solution] Provided is an information processing apparatus including: an activity detection unit configured to detect an
(Continued)

activity of a user who currently plays back a content; a tag generation unit configured to generate tag information on the basis of information on the activity; and a tag association unit configured to associate the tag information with one or more positions in the content, the one or more positions corresponding to the activity.

15 Claims, 17 Drawing Sheets

(51) Int. Cl.
<table>
<tr><td>G06F 13/00</td><td>(2006.01)</td></tr>
<tr><td>H04N 21/4788</td><td>(2011.01)</td></tr>
<tr><td>H04N 21/84</td><td>(2011.01)</td></tr>
<tr><td>G06Q 50/00</td><td>(2012.01)</td></tr>
<tr><td>H04N 21/2668</td><td>(2011.01)</td></tr>
<tr><td>H04N 21/431</td><td>(2011.01)</td></tr>
<tr><td>H04N 21/45</td><td>(2011.01)</td></tr>
<tr><td>H04N 21/462</td><td>(2011.01)</td></tr>
<tr><td>H04N 21/472</td><td>(2011.01)</td></tr>
<tr><td>H04N 21/475</td><td>(2011.01)</td></tr>
<tr><td>H04N 21/8547</td><td>(2011.01)</td></tr>
<tr><td>H04L 12/58</td><td>(2006.01)</td></tr>
<tr><td>H04N 21/442</td><td>(2011.01)</td></tr>
<tr><td>H04N 21/845</td><td>(2011.01)</td></tr>
<tr><td>H04N 21/858</td><td>(2011.01)</td></tr>
</table>

(52) U.S. Cl.
CPC ..... *H04N 21/2668* (2013.01); *H04N 21/4316* (2013.01); *H04N 21/44222* (2013.01); *H04N 21/4532* (2013.01); *H04N 21/4622* (2013.01); *H04N 21/475* (2013.01); *H04N 21/4788* (2013.01); *H04N 21/47217* (2013.01); *H04N 21/84* (2013.01); *H04N 21/8455* (2013.01); *H04N 21/858* (2013.01); *H04N 21/8547* (2013.01)

(58) Field of Classification Search
USPC .......................................................... 709/206
See application file for complete search history.

(56) References Cited

U.S. PATENT DOCUMENTS

<table>
<tr><td>2005/0005308 A1*</td><td>1/2005</td><td>Logan ................... G06Q 30/06<br>725/135</td></tr>
<tr><td>2005/0177861 A1</td><td>8/2005</td><td>Ma et al.</td></tr>
<tr><td>2008/0285940 A1*</td><td>11/2008</td><td>Kulas ................ G11B 27/3027<br>386/248</td></tr>
<tr><td>2009/0019487 A1*</td><td>1/2009</td><td>Kulas ................ H04N 5/44543<br>725/41</td></tr>
<tr><td>2010/0004975 A1</td><td>1/2010</td><td>White et al.</td></tr>
<tr><td>2013/0007787 A1*</td><td>1/2013</td><td>John ................ H04N 21/42203<br>725/10</td></tr>
</table>

FOREIGN PATENT DOCUMENTS

<table>
<tr><td>JP</td><td>2008-305435 A</td><td>12/2008</td></tr>
<tr><td>JP</td><td>2009-077443 A</td><td>4/2009</td></tr>
<tr><td>JP</td><td>2011-055270 A</td><td>3/2011</td></tr>
<tr><td>JP</td><td>2011-108147 A</td><td>6/2011</td></tr>
<tr><td>JP</td><td>2012-147404 A</td><td>8/2012</td></tr>
<tr><td>JP</td><td>2013-012955 A</td><td>1/2013</td></tr>
</table>

* cited by examiner

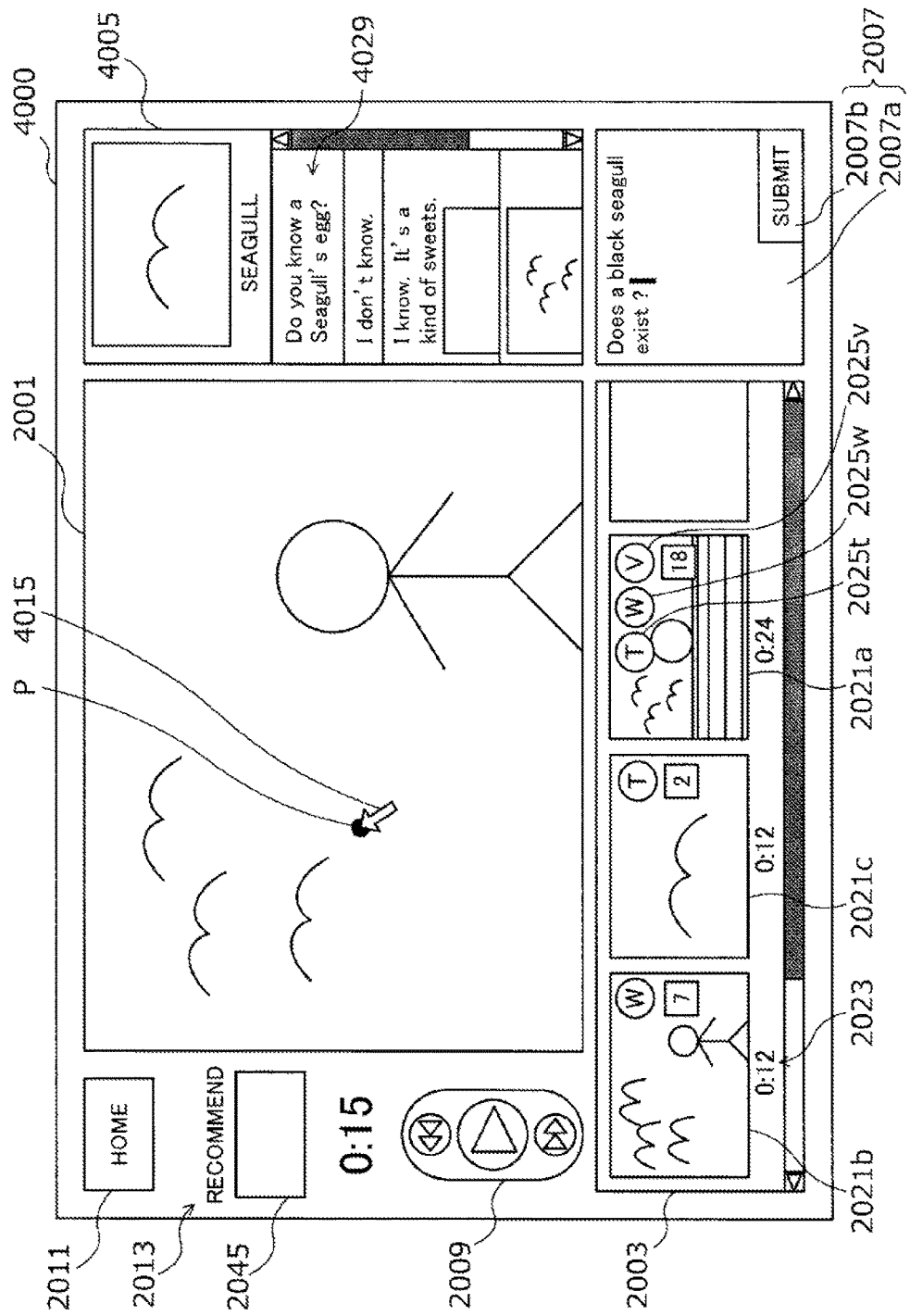

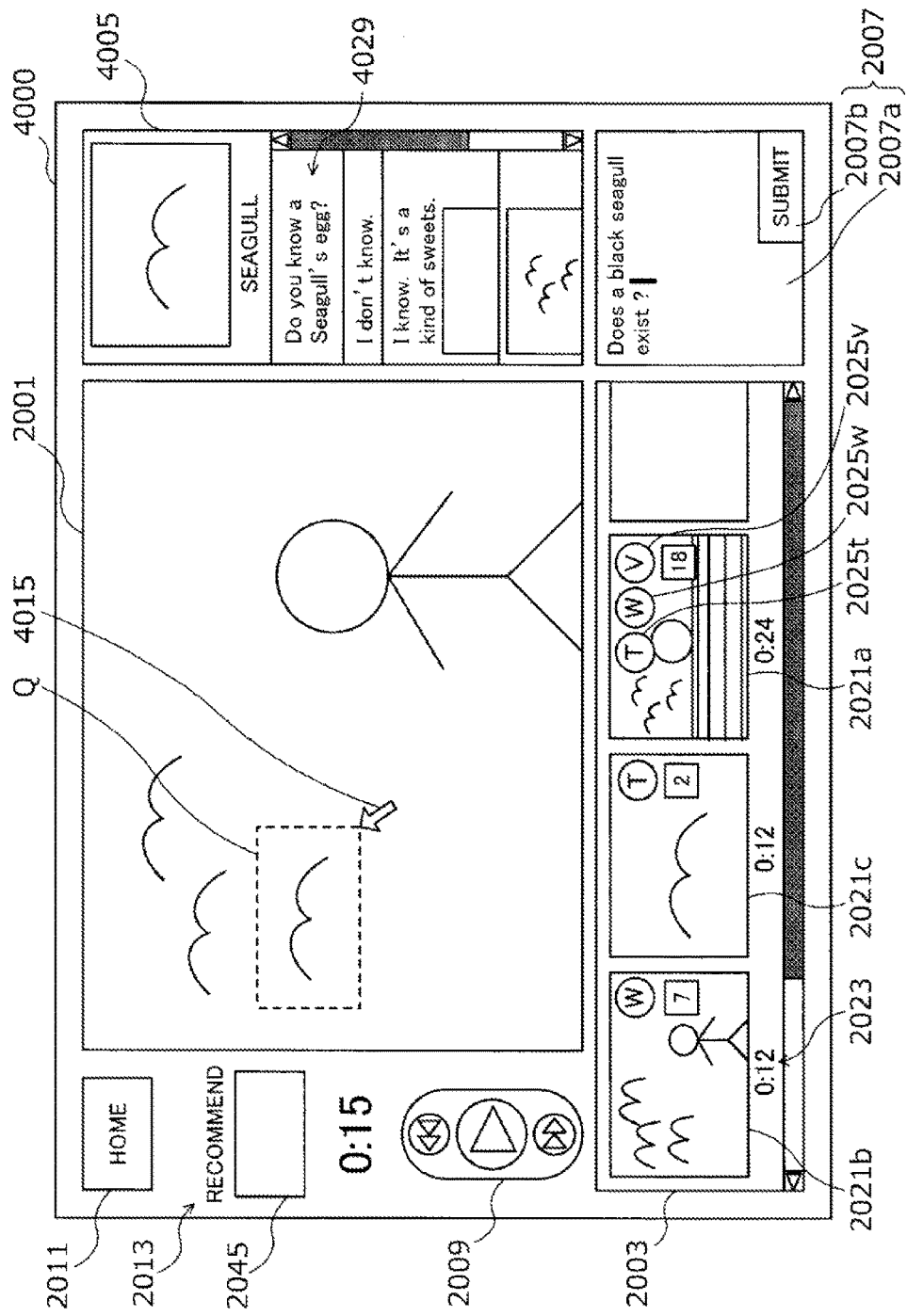

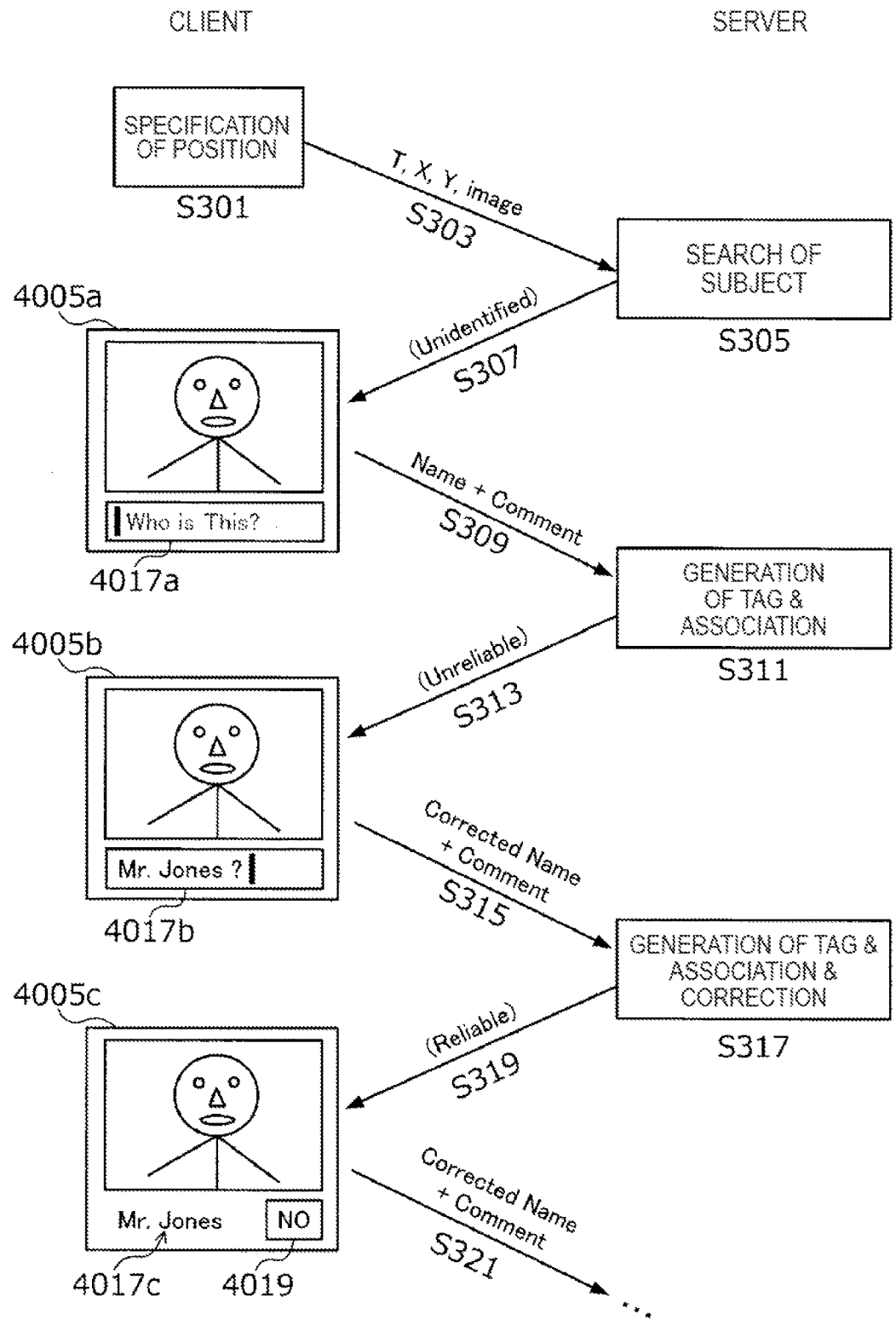

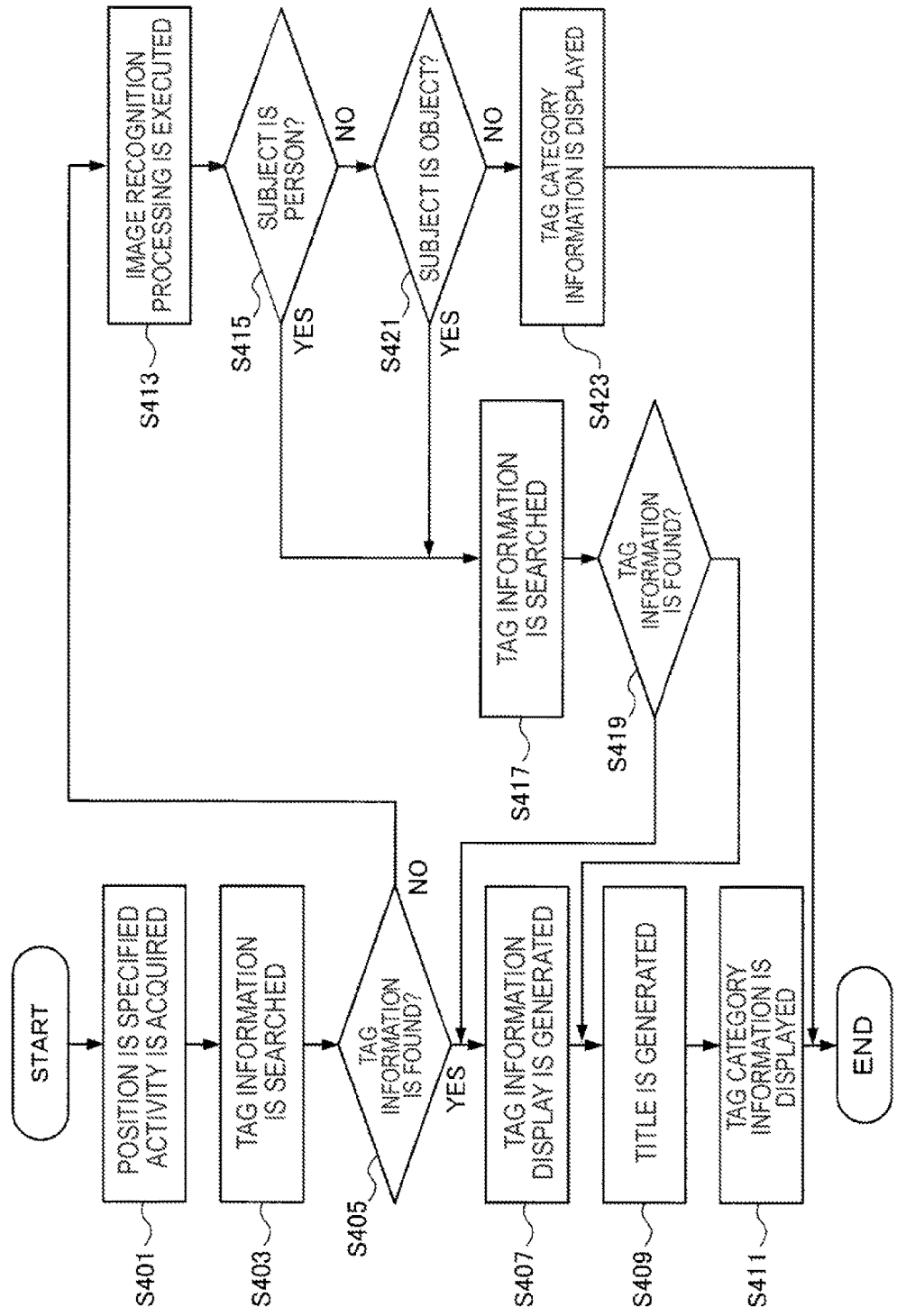

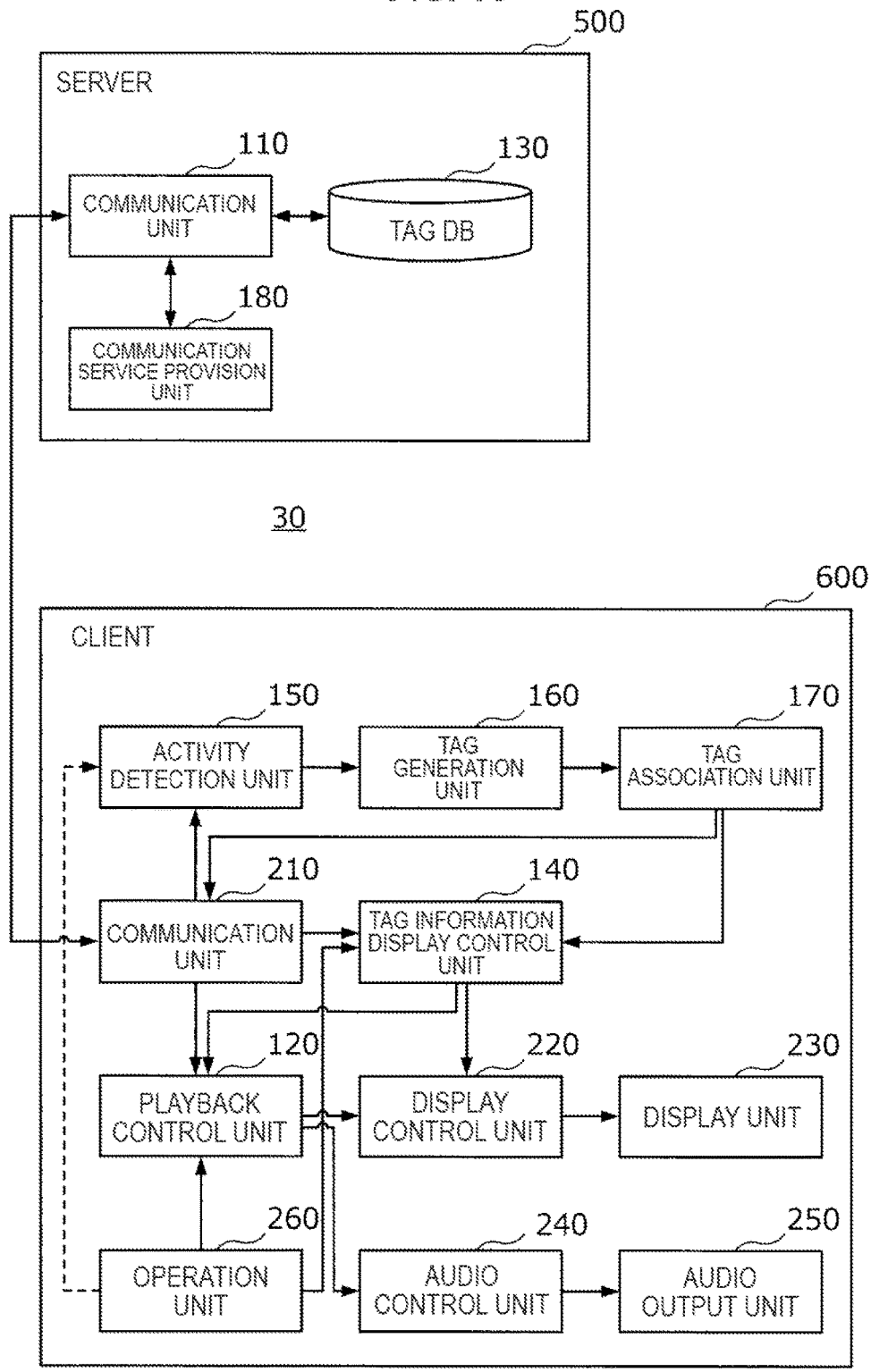

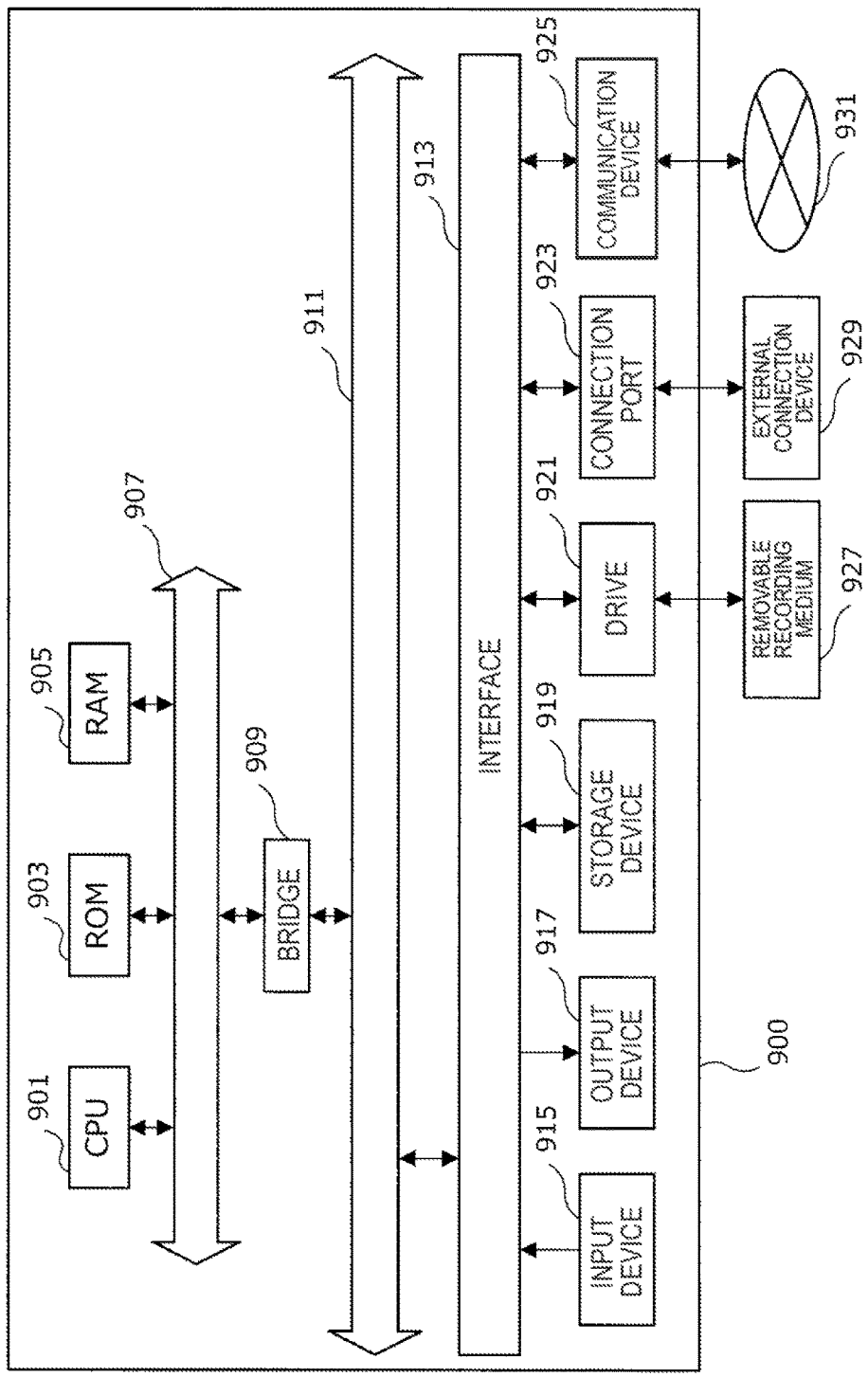

INFORMATION PROCESSING APPARATUS AND INFORMATION PROCESSING METHOD

TECHNICAL FIELD

The present disclosure relates to an information processing apparatus and an information processing method.

BACKGROUND ART

Viewing experiences of contents that have been originally carried out in one direction, such as broadcasted television programs, are becoming bidirectional, which means that viewers carry out some activities with respect to contents because of diversification of contents provision means and diffusion of information transmission means such as social media in recent years. For example, Patent Literature 1 discloses a technology for presenting comments submitted to an external sharing website to viewers viewing a program that is currently broadcasted, thereby providing a bidirectional viewing experience to the viewers.

CITATION LIST

Patent Literature

Patent Literature 1: JP 2013-12955A

SUMMARY OF INVENTION

Technical Problem

As a result of realization of bidirectional viewing experiences of contents as in the above example, a huge amount of information is generated in a network on the basis of activities that are carried out by users with respect to contents. For example, much of information, such as comments input by users with respect to a content and information on another content viewed by a user who has executed web search regarding a content and then has been touched off by the content as in the example of Patent Literature 1, is stored in a server and a terminal device in the network but is not practically used in association with the original content.

In view of this, the present disclosure proposes an information processing apparatus and an information processing method, each of which is novel and improved and is capable of associating information generated on the basis of an activity that is carried out by a user with respect to a content with the content, thereby effectively using the information.

Solution to Problem

According to the present disclosure, there is provided an information processing apparatus including: an activity detection unit configured to detect an activity of a user who currently plays back a content; a tag generation unit configured to generate tag information on the basis of information on the activity; and a tag association unit configured to associate the tag information with one or more positions in the content, the one or more positions corresponding to the activity.

According to the present disclosure, there is provided an information processing method including: detecting an activity of a user who currently plays back a content; generating tag information on the basis of information on the activity; and associating the tag information with one or more positions in the content, the one or more positions corresponding to the activity.

Advantageous Effects of Invention

According to the present disclosure as described above, it is possible to associate information generated on the basis of an activity that is carried out by a user with respect to a content with the content, thereby effectively using the information.

BRIEF DESCRIPTION OF DRAWINGS

FIG. 12 illustrates a display example of a playback screen in Embodiment 2 of the present disclosure.

FIG. 13 illustrates a display example of a playback screen in Embodiment 2 of the present disclosure.

FIG. 14 illustrates an example of tag category information display in Embodiment 2 of the present disclosure.

FIG. 15 is a flowchart showing an example of a display process of tag category information display in Embodiment 2 of the present disclosure.

FIG. 16 is a block diagram showing a schematic functional configuration of devices according to Embodiment 3 of the present disclosure.

FIG. 17 is a block diagram showing a hardware configuration of an information processing apparatus.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

1. Embodiment 1
1-1. Outline of System
1-2. Functional Configuration
1-3. Screen Display Example
2. Embodiment 2
3. Embodiment 3
4. Hardware Configuration
5. Supplement

1. Embodiment 1

(1-1. Outline of System)

Figure 1:
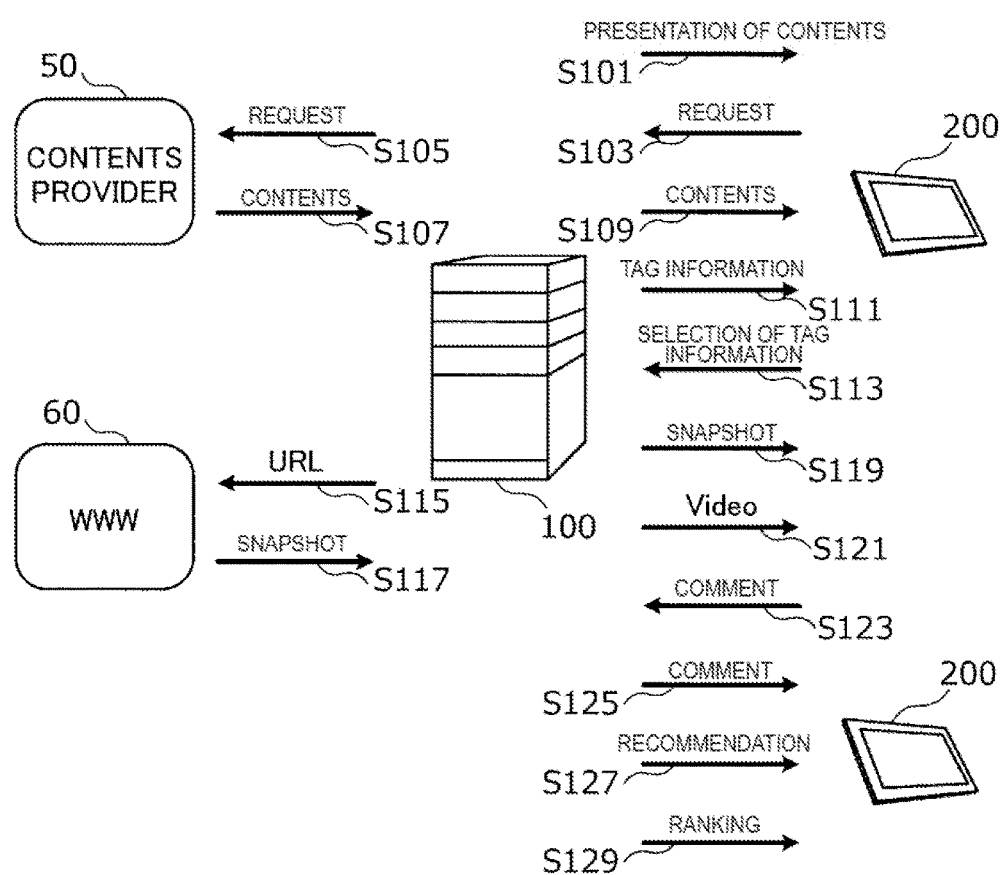
FIG. 1 illustrates outline of a system according to Embodiment 1 of the present disclosure.

FIG. 1 illustrates outline of a system according to Embodiment 1 of the present disclosure. When referring to FIG. 1, a system 10 according to this embodiment includes a server 100 and a client 200. Both the server 100 and the client 200 are realized by a hardware configuration of an information processing apparatus described below and are connected to each other via any one of various wired or wireless networks. Note that the server 100 is not always needed to be realized as a single information processing apparatus and may be realized by cooperation of a plurality of information processing apparatuses connected to one another via a network.

The server 100 presents viewable contents to the client 200 (S101). A user of the client 200 selects a content that the user wants to view from the presented contents and transmits a request to the server 100 (S103). The server 100 that has received the request transfers the request to, for example, a contents provider 50 such as a video distribution server (S105) and acquires the content requested by the user of the client 200 (S107).

When the server 100 provides the content acquired from the contents provider 50 to the client 200 (S109), the server 100 provides the content together with tag information (S111). The tag information is, for example, information generated by the server 100 on the basis of an activity of another user who has viewed the same content and is associated with at least a playback position of the content. The activity of the user herein can be, for example, submitting a comment, executing web search, or viewing other contents such as a photograph and a video during playback of the content. In this embodiment, such tag information generated on the basis of the activity of the user is presented together with the content. By selecting the tag information, for example, the user of the client 200 can easily access information related to the content and can know how other users feel about the content.

In the case where the user of the client 200 selects a piece of the tag information (S113), the server 100 accesses a world wide web (WWW) 60 with the use of, for example, a uniform resource locator (URL) included in the selected tag information (S115) and acquires a snapshot of a web page (S117). The acquired snapshot is transmitted to the client 200 (S119). Further, in the case where a comment from another user and another content (Video) are included in the tag information, the server 100 also provides such information to the client 200 (S121).

The user of the client 200 can input a comment to the content (S123). The server 100 further generates tag information on the basis of the new comment received from the client 200. Further, other activities carried out by the user of the client 200 with respect to the content, such as information on results of web search executed regarding the content and information on another content that the user has viewed, can also be transmitted together with the comment to the server 100. The server 100 generates new tag information on the basis of the above information and additionally associates the new tag information with the content.

Further, the server 100 may provide not only the content itself but also information such as comments of other users and recommendation and ranking of contents to the client 200 (S125 to S129). Based on such information, for example, a content to be viewed by the user of the client 200 can be easily selected.

Figure 2:
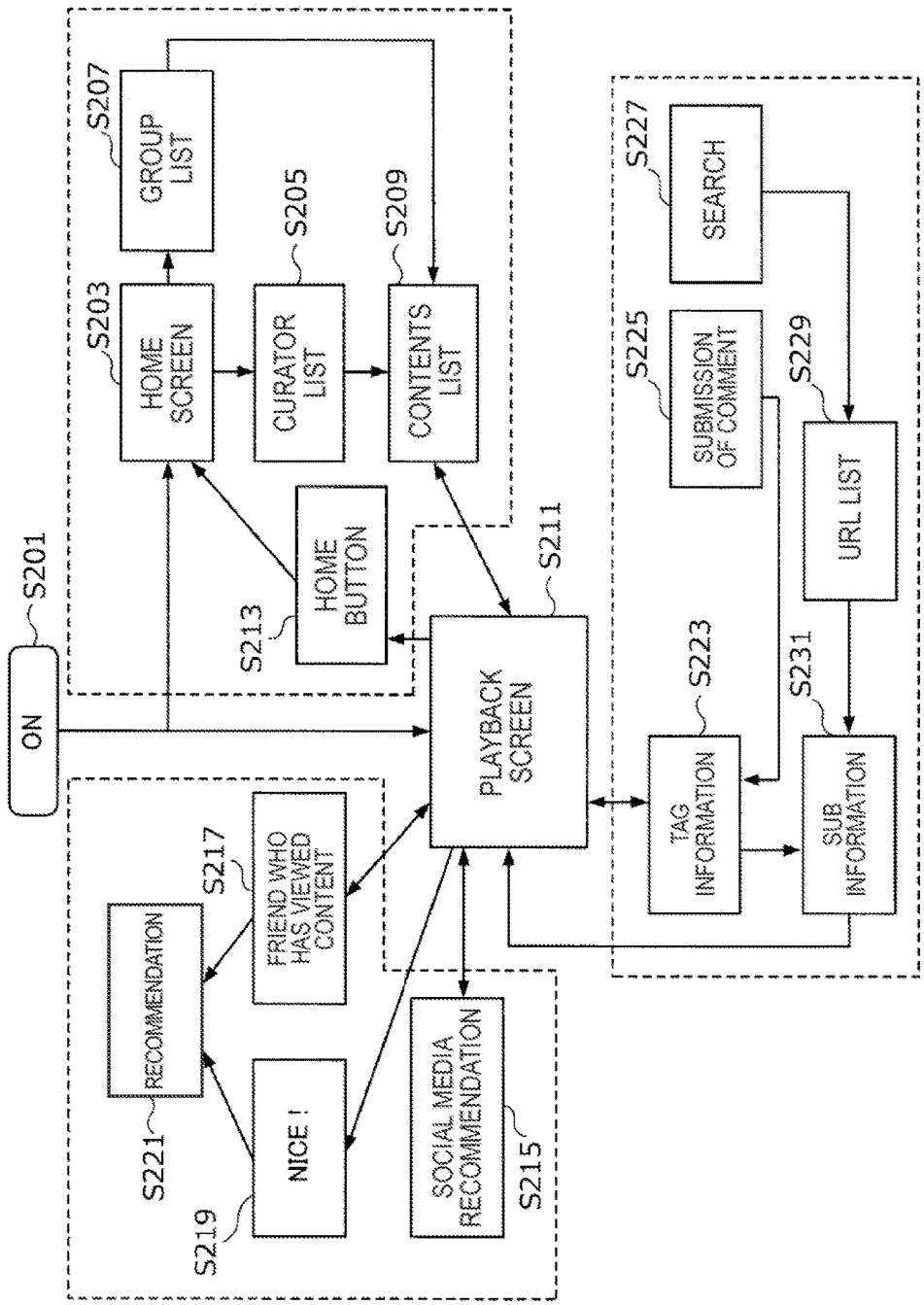
FIG. 2 shows an example of a flow of information in the system illustrated in FIG. 1.

FIG. 2 shows an example of a flow of information in the system illustrated in FIG. 1. When referring to FIG. 2, in the system 10 according to this embodiment, the flow can be roughly divided into the following three flows: content selection (S201 to S213); recommendation (S215 to S221); and sub information (S223 to S231).

In the case where an application for allowing a user to view a content is started in the client 200 (S201), a home screen (S203) is displayed. A curator list (S205) and/or a group list (S207) are/is displayed on the home screen. In this embodiment, a curator is a user who arranges contents provided via the system 10. For example, the curator collects contents from a large number of contents in accordance with his/her taste. In the case where the user selects one curator from the curator list (S205), a list of contents (S209) collected by the curator is displayed. A general user can easily access contents that suit the user's taste by following a curator having taste similar to that of the user.

Meanwhile, in this embodiment, a group is not a group having a subordinate relationship such as a curator and a follower described above but is a group in which users are equal partners. In the system 10, for example, contents viewed or positively evaluated by a plurality of users in the group can be collected. The group may be, for example, a social group that is intentionally set by a user, such as a group of friends, or a group into which users who are assumed to have a similar taste are automatically classified on the basis of, for example, collection of viewing history of contents and tag information described below. In the case where a user selects one group from the group list (S207), the list of contents (S209) collected in association with the group is displayed. The user can easily access contents such as a content viewed by a friend or a content viewed by another user having a similar taste via the group list.

In the case where the user selects one content from the list of contents (S209), a playback screen (S211) of the content is displayed. By selecting a home button (S213) displayed on the playback screen, the user can return the playback screen to the home screen (S203). Note that, for example, in the case where the application has been interrupted without viewing the entire content or in the case where a content to be viewed first is set in advance, the playback screen (S211) of the content may be automatically displayed after the application is started (S201).

On the playback screen (S211) of the content, not only the content that is currently played back but also information on recommendation can be displayed. In the example of FIG. 2, recommendation information (S215) from social media is displayed on the playback screen. Further, information (S217) on a friend who has viewed the same content can also be displayed on the playback screen. Furthermore, the user can also input positive evaluation (S219 "Nice!") of the content with the use of a button displayed on the playback screen. In the case where positive evaluation is input, the content can be recommended (S221). For example, the content may be recommended to another user in the same group as the user, whereas, in the case where the user is a curator, the content may be recommended to a follower. At this time, a user who has already viewed the content may be excluded from a target to which the content is recommended on the basis of the information (S217) on the friend whose has viewed the same content.

Further, not only the content that is currently played back but also tag information (S223) can be displayed on the playback screen (S211) of the content. In the example illustrated in FIG. 2, the tag information is generated by the user submitting a comment to the social media (S225) and the user searching the web (S227). Such generation of the tag information will be described in detail below. The tag information, a URL list (S229) obtained by search, and the like may be displayed as sub information (S231) on the playback screen (S211) in association with the content.

(1-2. Functional Configuration)

Figure 3:
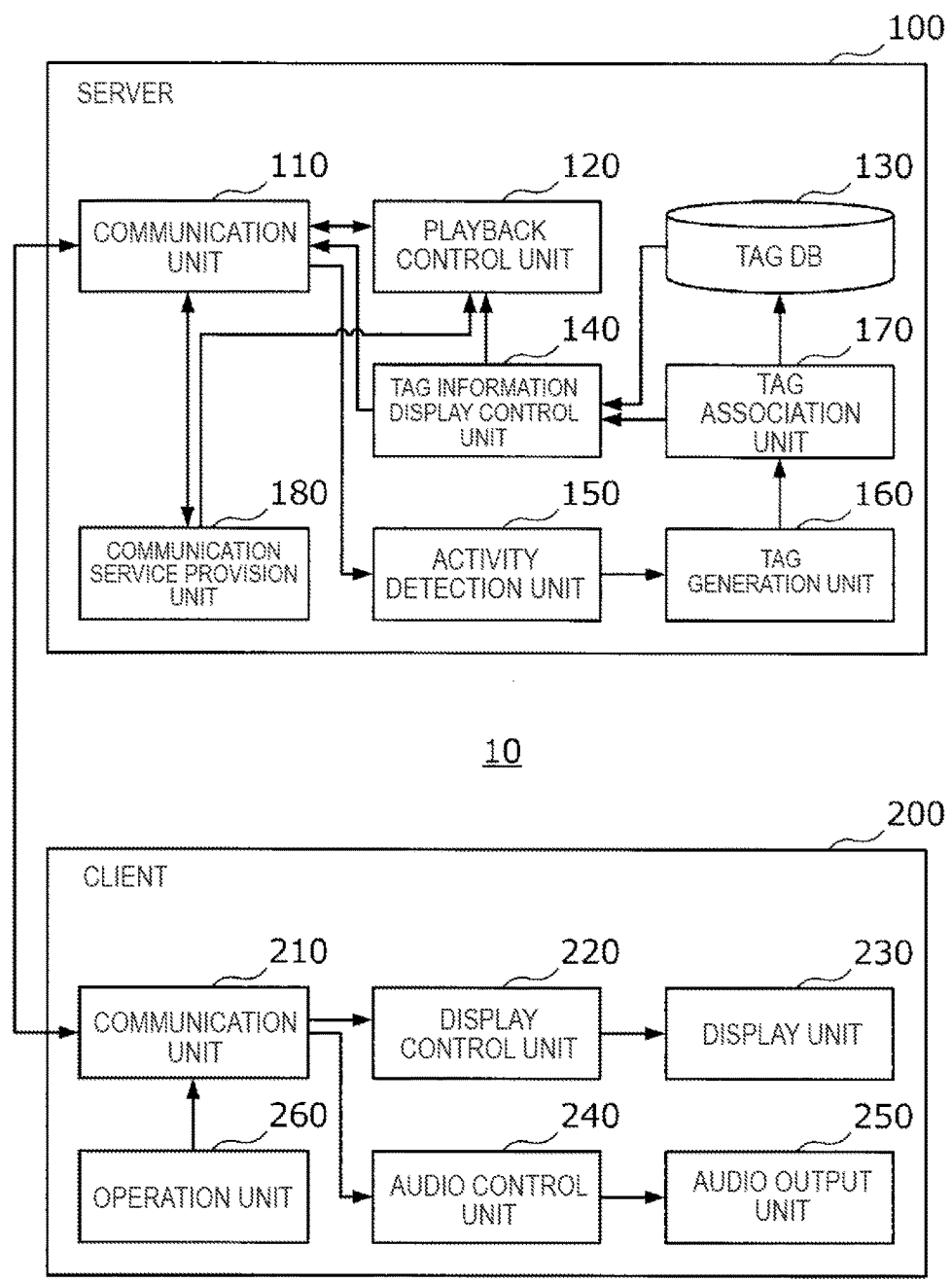
FIG. 3 is a block diagram showing a schematic functional configuration of devices according to Embodiment 1 of the present disclosure.

FIG. 3 is a block diagram showing a schematic functional configuration of devices according to Embodiment 1 of the present disclosure. Hereinafter, with reference to FIG. 3, the functional configuration of the devices will be described. Note that the functional configuration illustrated in FIG. 3 is simplified for describing this embodiment, and the devices may further include a functional configuration that is not illustrated in FIG. 3. The functional configuration that is not illustrated in FIG. 3 can be a functional configuration that has already been known as a general functional configuration of the devices, and therefore detailed description thereof will be omitted.

(Server)

The server 100 includes a communication unit 110, a playback control unit 120, a tag DB 130, a tag information display control unit 140, an activity detection unit 150, a tag generation unit 160, a tag association unit 170, and a communication service provision unit 180.

The communication unit 110 is realized as, for example, a communication device and communicates with the client 200 via any one of various wired or wireless networks. The communication unit 110 also communicates with the contents provider 50, the WWW 60, and the like via the network to thereby acquire content data. The communication unit 110 provides the received content data to the playback control unit 120 and transmits the content data to the client 200 in accordance with control of the playback control unit 120. Further, the communication unit 110 transmits data for displaying tag information to the client 200 in accordance with control of the tag information display control unit 140. Furthermore, the communication unit 110 intercepts information that is transmitted/received by a communication unit 210 of the client 200 in response to various types of activities executed by the user of the client 200 with respect to the content, thereby providing the information to the activity detection unit 150. Moreover, the communication unit 110 transmits/receives information on a service provided by the communication service provision unit 180 to/from the client 200.

The playback control unit 120 is realized by, for example, a processor such as a CPU operating in accordance with a program stored in a memory and controls playback of the content data acquired by the communication unit 110. For example, the playback control unit 120 can sequentially playback contents acquired from the contents provider 50 from the beginning unless the user of the client 200 performs additional operation. Herein, for example, in the case where tag information on the content generated by the tab information display control unit 140 described below is displayed on the playback screen of the content and the user of the client 200 selects the displayed tag information, the playback control unit 120 may play back the content from a playback position corresponding to the tag information. In the case where a communication service related to the tag information is provided by the communication service provision unit 180 described below, the playback control unit 120 may play back the content so that a range including the playback position corresponding to the tag information is repeated. Further, the playback control unit 120 may display the home screen for selecting a content.

The tag DB 130 is realized as, for example, a storage device and stores tag information generated regarding the content. The tag information is generated by, for example, the tag generation unit 160 described below and is associated with at least a playback position of the content by the tag association unit 170 and is then stored in the tag DB 130. Further, the tag information may include information prepared as initial setting information. The tag information can include, for example, text and may include a link to a web page or another content, a thumbnail thereof, and the like. For example, in the case where the playback position of the content is defined by a timestamp, the tag information can be recorded as "tag information associated with a timestamp 1h23m45s678". Note that the playback position with which the tag information is associated may be defined as a range. Further, in the case where the content is a video content, tag information may be associated with a position in the video content on the screen. In this case, the tag information can be recorded as, for example, "the tag information associated with (X, Y, T)=(0.123, 0.456, 1h23m45s678)". In this example, X denotes a horizontal position on the screen, Y denotes a vertical position on the screen, and T denotes a timestamp. Note that the positions on the screen such as X and Y may be recorded as normalized values in consideration of, for example, a difference in a size of the playback screen of the client 200. The position on the screen with which the tag information is associated can be defined as a range or a region.

The tag information display control unit 140 is realized by, for example, the processor such as the CPU operating in accordance with a program stored in the memory and displays the tag information read out from the tag DB 130 on the playback screen of the content. For example, the tag information display control unit 140 may display the tag information on the playback screen so that pieces of the tag information are arrayed for associated playback positions, respectively. At this time, the tag information display control unit 140 may display pieces of the tag information associated with close playback positions as a group. In the case where the tag information is also associated with a position on the screen, the tag information display control unit 140 may separately display pieces of the tag information which are associated with the same playback position or close playback positions but are associated with different positions on the screen. The tag information display control unit 140 can display the tag information as a selectable icon on the playback screen. The icon can include, for example, a capture image of the content in a playback position associated with a piece of the tag information and an icon indicating the type of information included in the tag information. In the case where the user of the client 200 selects the icon of the tag information, the tag information display control unit 140 may additionally display a screen for individually displaying grouped tag information together with the tag information on the playback screen. Further, at this time, the playback control unit 120 may cause a playback position of the content to jump to a playback position of the selected tag information and play back the content as described above. Note that a specific example of display of the tag information by the tag information display control unit 140 will be described below.

The activity detection unit 150 is realized by, for example, the processor such as the CPU operating in accordance with a program stored in the memory and detects an activity of the user who currently plays back the content. More specifically, the activity detection unit 150 intercepts information transmitted and received to/from the client 200 in which the content is played back via the communication unit 110 and detects, on the basis of the information, an activity executed by the user during playback of the content in the client 200. For example, the activity detected by the activity detection unit 150 can include submission of a comment by the user. For example, the comment may be submitted in a service provided by the server 100 or may be submitted to other social media. Further, the activity detected by the activity detection unit 150 may include accessing to information other than the content that is currently played back by the user. Herein, the accessed information may be, for example, a web page or another content. Such information can be accessed by the user executing, for example, keyword search. Further, the activity detection unit 150 may detect, as an activity, statement of the user in the communication service provided by the communication service provision unit 180 described below.

The tag generation unit 160 is realized by, for example, the processor such as the CPU operating in accordance with a program stored in the memory and generates new tag information on the basis of information on the activity detected by the activity detection unit 150. As described above, the generated tag information can include, for example, text, a link to a web page or another content, a thumbnail thereof, and the like. The tag generation unit 160 can generate such tag information by analyzing various types of logs related to detected activities of the user. For example, in the case where the user submits a comment or makes statement in the communication service during playback of the content in the client 200, the activity detection unit 150 can acquire information on the submitted comment or the statement, and the tag generation unit 160 can generate tag information including the comment as text. Further, for example, in the case where the user executes web search during playback of the content in the client 200, the activity detection unit 150 can acquire information on a search query or search results, and the tag generation unit 160 can generate tag information including text of a keyword included in the search query and links and snapshots of web pages which are search results. Further, for example, in the case where the user plays back another content during playback of the content in the client 200, the activity detection unit 150 can acquire information on an address of the another content that is played back or the another content itself, and the tag generation unit 160 can generate tag information including a link to the another content or the another content itself. Note that the link and the another content may be clearly attached by user operation at the time of submitting a comment, for example.

The tag association unit 170 is realized by, for example, the processor such as the CPU operating in accordance with a program stored in the memory and associates the tag information generated by the tag generation unit 160 with a playback position of the content, the playback position corresponding to an activity based on which the tag information is generated. The tag information associated with the content by the tag association unit 170 may be stored in, for example, the tag DB 130 or may be provided to the tag information display control unit 140 and be displayed in the client 200 in real time. For example, the playback position with which the tag information is associated can be a position in the content (content that is originally played back) played back when a comment is submitted, when web search is executed, or when playback of another content is started. Alternatively, in the case where it is possible to specify when the user starts inputting a comment, when the user starts inputting a keyword for web search, and when the user starts an application for playing back another content, the tag information may be associated with playback positions corresponding thereto. Note that, in the case where playback positions in which a plurality of pieces of tag information are specified are close to one another, the tag association unit 170 may associate the plurality of pieces of tag information with a common playback position. Further, in this embodiment, the tag information can also be associated with a position in the video content on the screen as described above. The tag association unit 170 associates the tag information with, for example, a position on the screen clearly specified by an activity of the user. Herein, the position on the screen may be specified as a range or a region. Alternatively, for example, in the case where the user views the content with the use of head mounted display (HMD) in the client 200 and an attention region of the user on the playback screen in the content is detectable with the use of gaze detection or the like, the tag association unit 170 may determine, on the basis of the detected attention region, a position on the screen with which the tag information is associated.

The communication service provision unit 180 is realized by, for example, the processor such as the CPU operating in accordance with a program stored in the memory and provides a communication service to users of a plurality of clients 200. The provided communication service can be, for example, a chat in which the users exchange statement. For example, the communication service provision unit 180 can provide a communication service to a plurality of users who have executed activities based on which tag information associated with close playback positions (and/or close positions on the screen) in the same content is generated. More specifically, for example, the communication service provision unit 180 establishes a chat room in which those users participate. A user who has entered the chat room can, for example, exchange statement on another screen on the playback screen described below. For example, a link to a web page or another content may be added to statement. Such information such as the statement of the users in the chat room and the link added to the statement can also be detected by the activity detection unit 150 as an activity performed during playback of the content. Further, the playback control unit 120 may play back the content so that a range including a target playback position is repeated while the user uses the chat room.

(Client)

The client 200 includes the communication unit 210, a display control unit 220, a display unit 230, an audio control unit 240, an audio output unit 250, and an operation unit 260. The client 200 can be, for example, any one of various types of terminal devices with which the user can view contents, such as various types of personal computers (PCs), tablet terminals, smartphones, game consoles, and media players.

The communication unit 210 is realized as, for example, a communication device and communicates with the server 100 via any one of various wired or wireless networks. The communication unit 210 receives content data from the server 100 and provides the content data to the display control unit 220 and the audio control unit 240. Further, the communication unit 210 receives data for displaying the tag information on the content from the server 100 and provides the data to the display control unit 220. Furthermore, the communication unit 210 transmits and receives the data in response to operation input performed by the user with respect to the operation unit 260 during playback of the content. For example, the communication unit 210 transmits a search query in response to operation input for search (input of a search keyword and instruction to execute search) performed with respect to the operation unit 260 and receives information such as a web page and another content obtained as a result of the search. Further, for example, the communication unit 210 transmits a comment to the server 100 or a server of social media in response to operation input for submitting the comment (input of text of a comment and instruction to execute submission of the comment) performed with respect to the operation unit 260. Thus, the data transmitted and received by the communication unit 210 during playback of the content is transmitted and received by another server or the like via the communication unit 110 of the server 100. By intercepting the data transmitted and received at this time, the communication unit 110 of the server 100 provides, to the activity detection unit 150, information on various types of activities executed by the user with respect to the content as described above.

The display control unit 220 is realized by, for example, the processor such as the CPU operating in accordance with a program stored in the memory and controls display of an image in the display unit 230 realized as any one of various types of display devices such as an LCD or an organic electroluminescence display. The display control unit 220 acquires, from the communication unit 210, the content data, data for displaying tag information on the content, and data received in response to operation input performed by the user with respect to the operation unit 260. The display control unit 220 displays a playback screen of the content on the display unit 230 on the basis of the above data. The playback screen can include, for example, a content image and an icon of the tag information displayed in the vicinity of the content image. Further, the display control unit 220 may display a screen for allowing the user to execute various types of activities with respect to the content on the playback screen or may separately display the screen and the playback screen. The display control unit 220 displays, for example, a comment input section for allowing the user to input a comment, a keyword input section for allowing the user to input a search keyword, and/or an operation element for allowing the user to specify a position on the screen serving as a target of an activity. Further, the display control unit 220 may display the home screen on the display unit 230 on the basis of the data acquired from the server 100. Note that an example of the screen displayed by the display control unit 220 on the display unit 230 will be described in more detail below.

The audio control unit 240 is realized by, for example, the processor such as the CPU operating in accordance with a program stored in the memory and controls output of audio from the audio output unit 250 realized as, for example, a speaker. The audio control unit 240 causes the audio output unit 250 to output content audio on the basis of the content data acquired from the communication unit 210. The content audio is audio synchronized with the content image displayed by the display unit 230. Further, the audio control unit 240 may acquire, from the communication unit 210, data received in response to operation input performed by the user with respect to the operation unit 260 and cause the audio output unit 250 to output audio on the basis of the data. Note that, although an example where the content is a video content has been described in this embodiment, a content to be played back or a content to be acquired by an activity of the user who currently plays back a certain content, may be a content including no image, such as a music content, in another embodiment. Such a content can be mainly output via the audio control unit 240 and the audio output unit 250.

The operation unit 260 is realized as any one of various types of input devices such as a touchscreen, a mouse, and a keyboard and acquires operation input from the user. Based on the acquired operation input, for example, information is transmitted to various servers including the server 100 via the communication unit 210. This makes it possible to control, for example, selection of a content to be played back, start and end of playback of the content, and the like. Operation input for search (input of a search keyword and instruction to execute search), operation input for submitting a comment (input of text of a comment and instruction to execute submission of the comment) and the like, which are acquired by the operation unit 260 during playback of the content, can also be transmitted to the various servers via the communication unit 210. The operation input acquired by the operation unit 260 may be provided to the display control unit 220 or the audio control unit 240 to be used for controlling an image displayed on the display unit 230 or audio output from the audio output unit 250.

(1-3. Screen Display Example)

(Home Screen)

Figure 4:
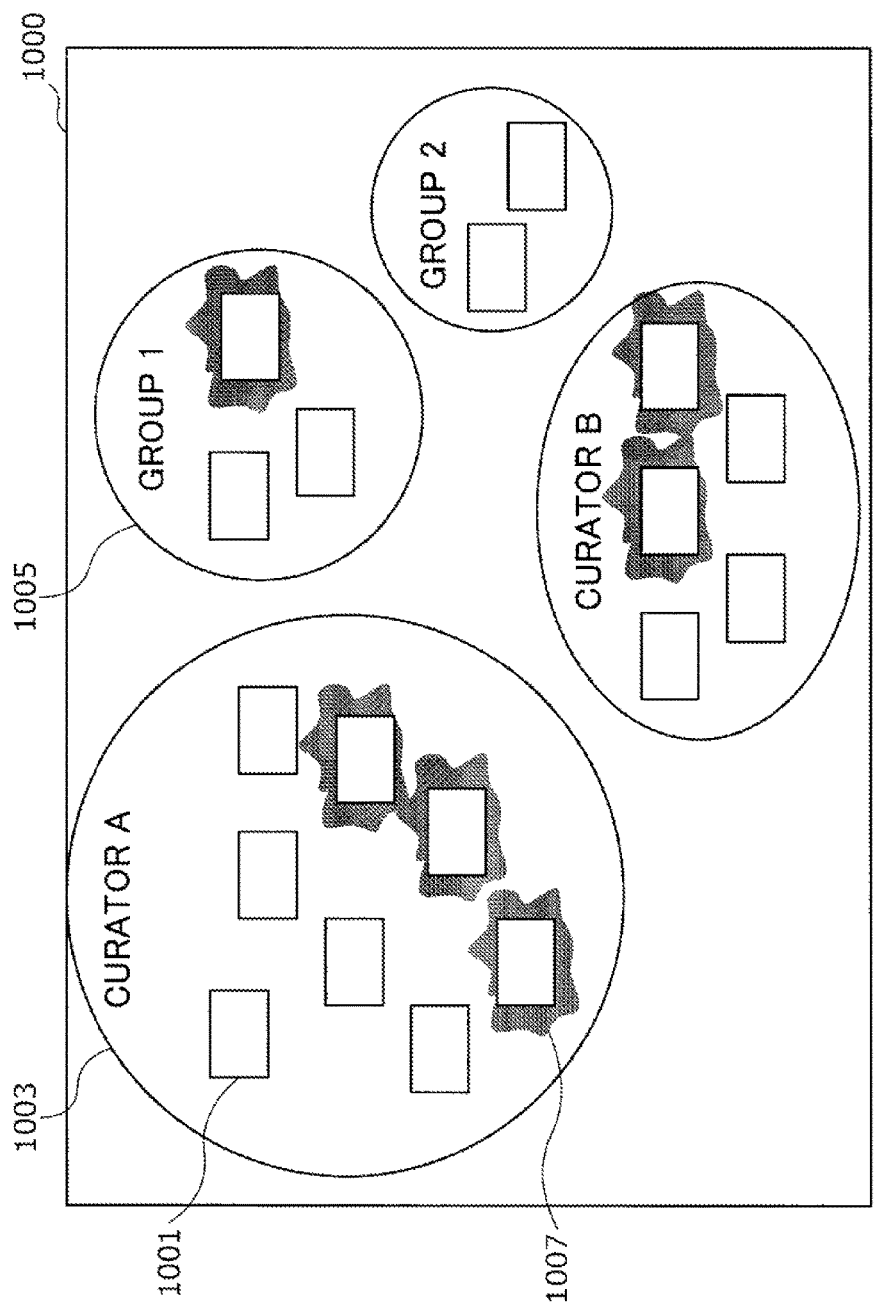
FIG. 4 illustrates a display example of a home screen in Embodiment 1 of the present disclosure.
Figure 5:
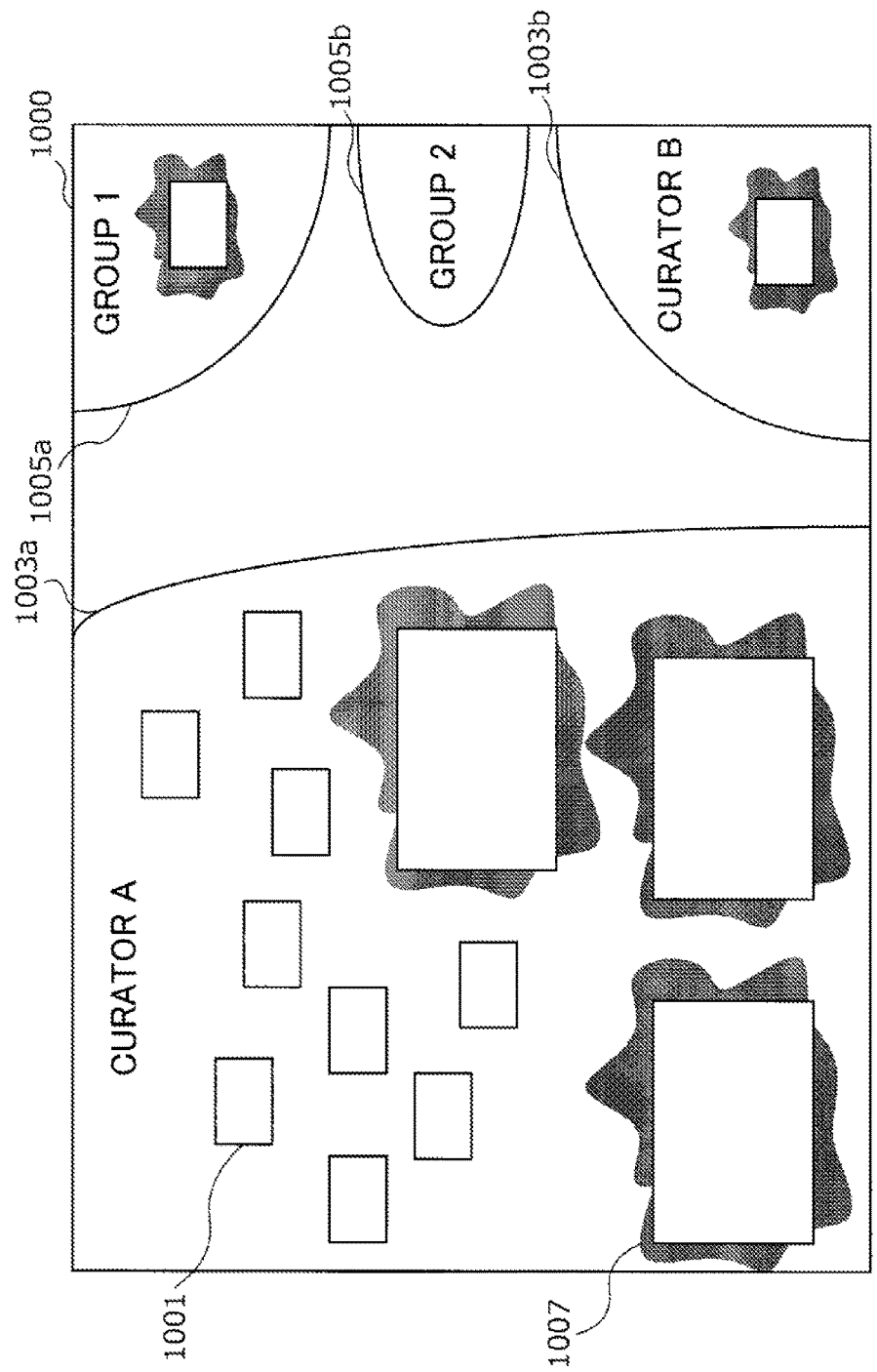
FIG. 5 illustrates a display example of a home screen in Embodiment 1 of the present disclosure.

FIG. 4 and FIG. 5 illustrate display examples of a home screen in Embodiment 1 of the present disclosure. The home screen can be displayed on the display unit 230 by control of the display control unit 220 when, for example, the user starts the application for viewing a content in the client 200.

When referring to FIG. 4, a content icon 1001 is displayed on a home screen 1000. The content icon 1001 is, for example, an image of a thumbnail or a snapshot of a content and is classified and arranged in a curator region 1003 or a group region 1005. Content icons 1001 of contents collected by the curator described above are displayed in the curator region 1003. The content icons 1001 of the contents collected on the basis of the group of the users described above are displayed in the group region 1005. Those regions can function as the curator list and the group list described above. In the example illustrated in FIG. 4, the curator region 1003 and the group region 1005 are displayed in circular or oval shapes. In the case where, for example, the user follows the curator or the user is classified into the group, the curator region 1003 thereof and the group region 1005 thereof can be largely displayed. In the case where, for example, the user frequently views contents collected on the basis of a curator or a group, a curator is very popular, and the user and a group have a similar taste, regions thereof may also be largely displayed.

In the case where a large number of contents are collected, the content icons 1001 arranged in each region may be representative content icons that are extracted in accordance with popularity, viewing frequency, and the like among the contents collected on the basis of each curator or each group. For example, in the case where many activities such as comments performed with respect to the content from other users are detected, a content icon 1001 thereof is displayed with effect 1007 such as glowing, so that the user can easily find a "popular" content. In the case where the user selects one of the regions, a list of contents corresponding to the curator or the group can be displayed. Further, in the case where the user selects the content icon 1001, viewing of the content may be directly started.

As illustrated in FIG. 5, in the case where the user enlarges the curator region 1003 or the group region 1005, the content icons 1001 arranged in the region are enlarged and displayed. Alternatively, in the case where contents arranged in the region are some of collected contents, content icons 1001 of other contents arranged in the region may be newly displayed by enlarging the region. In the case where a certain region is enlarged, another region can be shrunk or can be moved to a peripheral portion of the home screen 1000. In the example illustrated in FIG. 5, because a curator region 1003a of a curator A is enlarged, a curator region 1003b of a curator B and group regions 1005a and 1005b of groups 1 and 2 are shrunk and are moved to the peripheral portion of the home screen 1000.

(Playback Screen)

Figure 6:
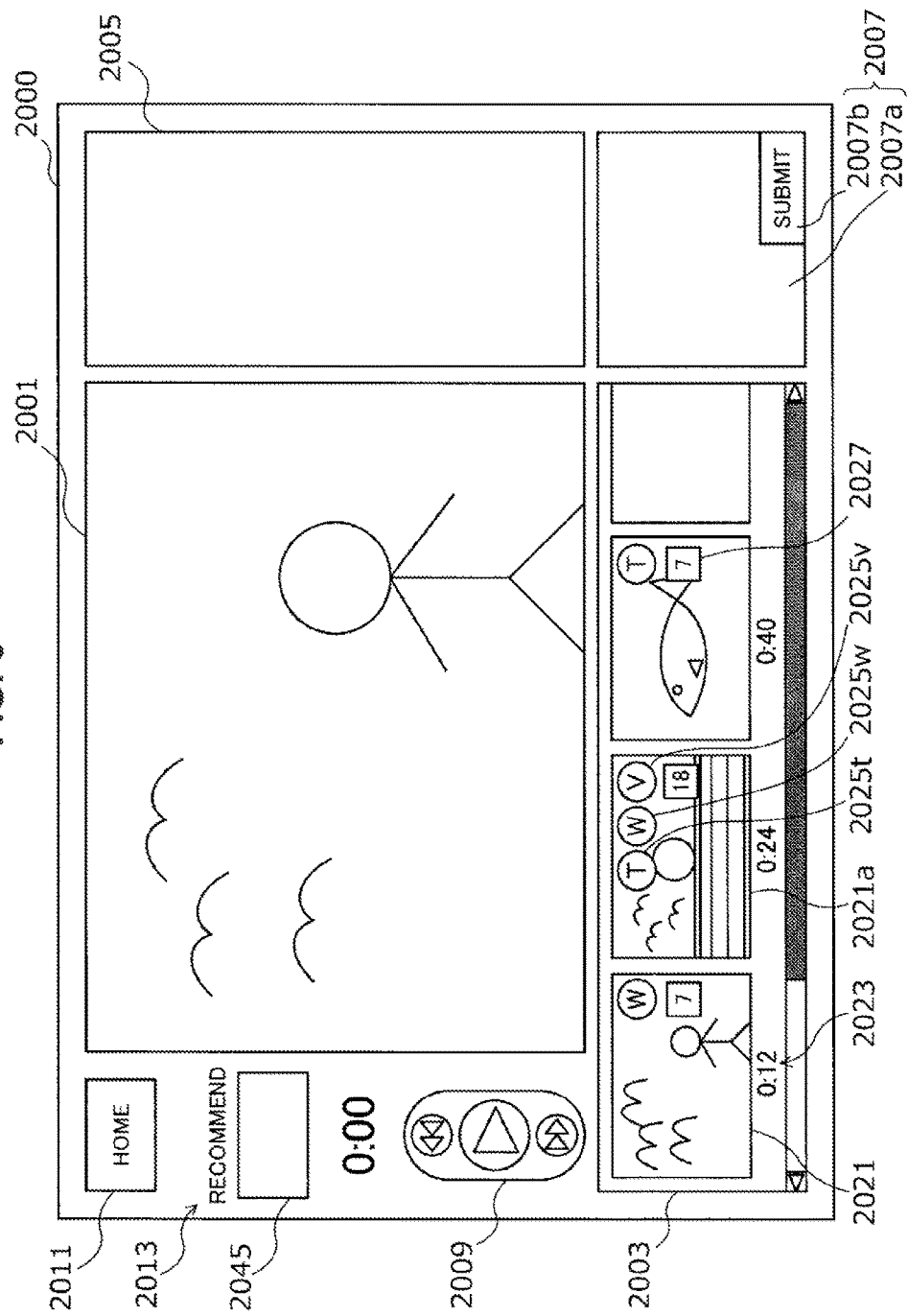
FIG. 6 illustrates a display example of a playback screen in Embodiment 1 of the present disclosure.
Figure 7:
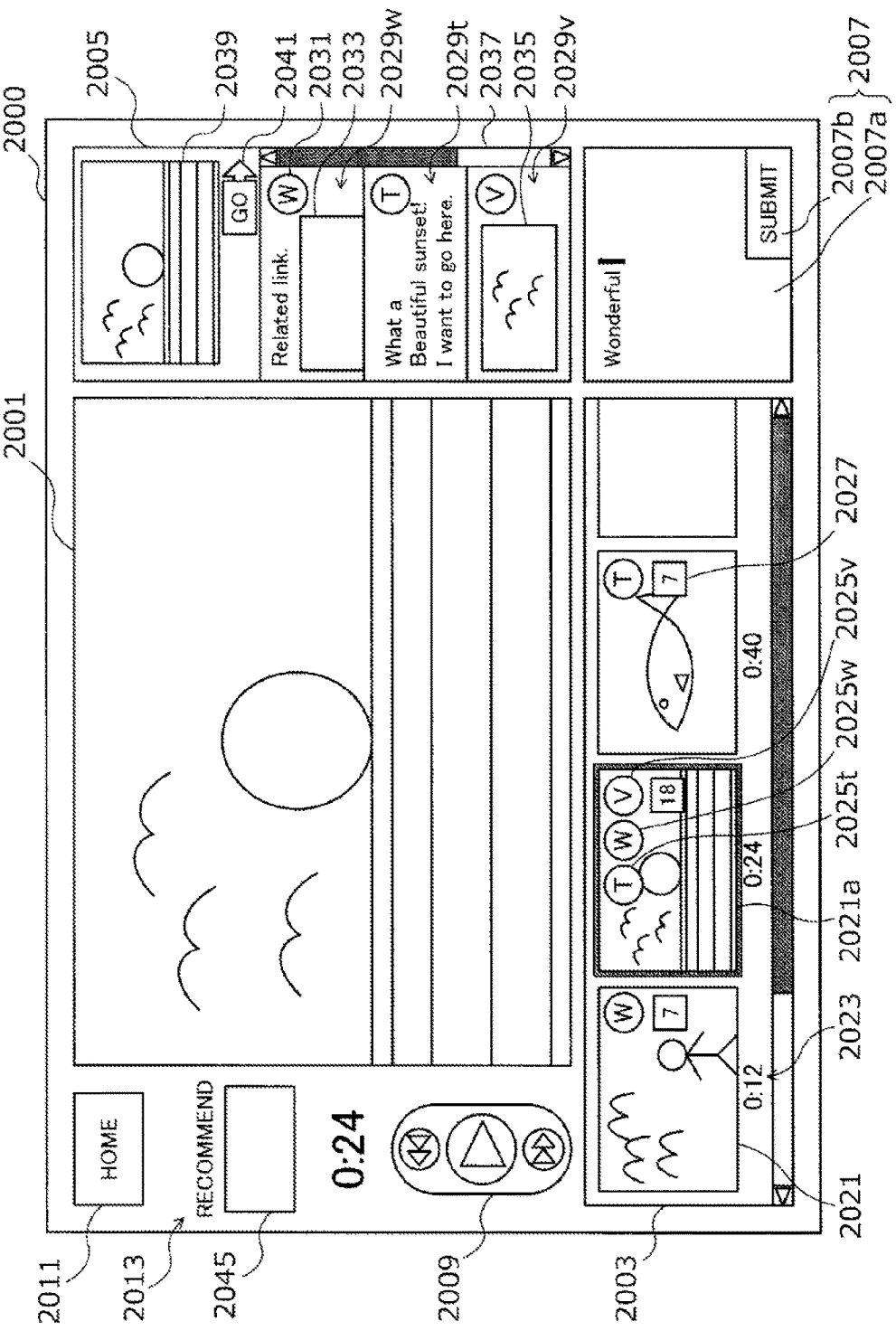
FIG. 7 illustrates a display example of a playback screen in Embodiment 1 of the present disclosure.

FIG. 6 and FIG. 7 illustrate display examples of a playback screen in Embodiment 1 of the present disclosure. In the case where, for example, the user starts the application for viewing a content in the client 200 and selects a content to be viewed via the home screen 1000 or the like described above, the playback screen can be displayed on the display unit 230 by control of the display control unit 220.

When referring to FIG. 6, a content image 2001, tag list display 2003, tag detail display 2005, a comment input section 2007, playback control 2009, a home button 2011, and recommendation information 2013 are displayed on a playback screen 2000.

The content image 2001 is an image of the content displayed on the basis of data that is transmitted by the server 100 to the client 200 in accordance with control of the playback control unit 120. Although the content is a video content in the example illustrated in FIG. 6, the content may be a content including no image such as a music content as described above. In that case, for example, an image provided from the server 100 in association with the music content or a visual effect image generated in the server 100 or the client 200 may be displayed as the content image 2001 or the content image 2001 may not be included in the playback screen 2000.

(Tag List Display)

The tag list display 2003 displays a list of tag information associated with the content that is currently played back, i.e., the content displayed as the content image 2001 in the example illustrated in FIG. 6. In this embodiment, data for displaying the list of the tag information is provided by the tag information display control unit 140 of the server 100. The tag information display control unit 140 can provide not only the data based on the tag information that has already been generated as described above but also data based on tag information that is newly associated with the content by the tag association unit 170. Therefore, in the case where the tag association unit 170 associates new tag information with the content on the basis of an activity of the user or another user who is viewing the content on the playback screen 2000, the tag list display 2003 can be dynamically updated to display including the new tag information on the basis of the new data provided from the tag information display control unit 140. More specifically, for example, a type icon 2025 described below may be added or the number of tags 2027 in a group may be gradually increased.

In the example illustrated in FIG. 6, as an icon indicating each piece of tag information, a capture image 2021 of the content in a playback position associated with each piece of the tag information is displayed on the tag list display 2003. The capture image 2021 can be displayed together with a timestamp 2023 indicating the corresponding playback position. The type icon 2025 of the tag information may also be added to the capture image 2021. In the example illustrated in FIG. 6, the tag information can include text (type icon 2025t), a link to a web page (type icon 2025w), and/or a link to another content (type icon 2025v), and the like. Based on display of the type icon 2025, the user can easily recognize which kind of information is included in each piece of the tag information.

In the example illustrated in FIG. 6, in the case where icons indicating pieces of tag information are associated with close playback positions, the icons are displayed as a group on the tag list display 2003. In such a case, display of the number of tags 2027 in the group may be added to the capture image 2021. For example, in the case where "18" is displayed as the number of tags 2027 in the group in a capture image 2021a at "0:24" which is the timestamp 2023, it means that eighteen pieces of tag information are associated in the vicinity of this playback position. In the case where the pieces of the tag information are grouped as described above, the plurality of type icons 2025 can also be added to the capture image 2021. For example, because the type icons 2025t, 2025w, and 2025v are displayed in the above capture image 2021a, it is found that text, a link to a web page, and a link to another content are included in the eighteen pieces of the tag information.

(Tag Detail Display)

In the case where an icon of a piece of the tag information displayed as the tag list display 2003 is selected, the tag detail display 2005 individually displays pieces of tag information grouped with the piece of the tag information. In this embodiment, data for displaying the tag detail display 2005, as well as the tag list display 2003, can be provided by the tag information display control unit 140 of the server 100. As described above, the tag information display control unit 140 can provide not only the data based on the existing tag information but also data based on tag information that is newly associated with the content by the tag association unit 170. Therefore, in the case where the tag generation unit 160 generates new tag information on the basis of an activity of the user or another user who is viewing the content on the playback screen 2000, the tag detail display 2005 can be updated to display including the new tag information. More specifically, for example, the new tag information can be added and displayed during playback of the content.

Herein, as illustrated in FIG. 6, the user does not select any of the icons of the tag information displayed as the tag list display 2003, the tag detail display 2005 is blank. In this case, advertisement or the like may be displayed instead of the tag detail display 2005. Meanwhile, in the example illustrated in FIG. 7, because the user selects the capture image 2021a displayed as the tag list display 2003, tag information included in a group corresponding to the capture image 2021a is displayed as the tag detail display 2005. At this time, as described above, a playback position of the content displayed as the content image 2001 can be caused to jump to a playback position (timestamp "0:24" in the example of FIG. 7) of the selected tag information.

In the example of FIG. 7, three tag information displays 2029t, 2029w, and 2029v including text, a web page, and another content, respectively, are displayed on the tag detail display 2005. In order to recognize types of information of those tags, a type icon 2031, which is similar to the type icon 2025 displayed on the tag list display 2003, may be displayed.

In the tag information display 2029w including the web page, a snapshot 2033 of the web page can be displayed. A link to the web page is set in the snapshot 2033, and the user may access the web page by selecting an image of the snapshot 2033. Further, a thumbnail 2035 of another content can be displayed in the tag information display 2029*v* including the another content. A link for playing back the another content is set in the thumbnail 2035, and the user may access the another content by selecting the thumbnail 2035. In this case, the another content can be played back on, for example, a screen other than the playback screen 2000. In another embodiment, for example, in order to increase the number of displayable tag information displays 2029, both the snapshot 2033 and the thumbnail 2035 are not displayed at the start of the tag detail display 2005, and, in the case where one of the tag information displays 2029 is selected, the snapshot 2033 and the thumbnail 2035 may be displayed as detailed information.

The eighteen pieces of the tag information are included in the group corresponding to the capture image 2021*a* as described above and are not displayed all at once in the tag detail display 2005 in the example illustrated in FIG. 7. In such a case, a scroll bar 2037 may be displayed on the tag detail display 2005 and the the tag information displays 2029 arrayed in a vertical direction may be browsed by scrolling. The tag information displays 2029 may be arrayed in, for example, chronological order or order of popularity that is determined on the basis of the number of accesses to the link of the web page or the content. Further, in the case where new tag information is associated with the content, the new tag information may be added on the top or bottom of the tag detail display 2005.

The example of FIG. 7 is different from modification examples described below in that, after the playback position of the content is caused to jump to the playback position of the selected tag information, playback of the content is continued from the playback position. In view of this, in order to show which scene the displayed tag information indicates, a capture image 2039 (the same image as the capture image 2021*a* in the example of FIG. 7) may be included in the tag detail display 2005. Furthermore, a jump button 2041 may be displayed together with the capture image 2039. In the case where the user selects the jump button 2041, the playback position of the content displayed as the content image 2001 is caused to jump to a playback position corresponding to the capture image 2039, i.e., a playback position corresponding to the tag information displayed as the tag detail display 2005.

(Display Element Related to Activity of User)

The comment input section 2007 includes a text input section 2007*a* and a submission button 2007*b* and receives submission of a comment from the user with respect to the content that is currently played back. The comment submitted with the use of the comment input section 2007 may be processed as, for example, a comment in a service provided by the server 100 or a comment in other social media. In any case, the tag generation unit 160 can generate new tag information on the basis of the submitted comment, and the tag association unit 170 can associate the generated tag information with the content. At this time, the tag association unit 170 may detect a playback position of the content when a comment is submitted by selecting the submission button 2007*b* or when the text input section 2007*a* is selected and input of text is started and may associate the generated tag information with the playback position. In the case where another tag information has already been associated in the vicinity of the playback position associated with the tag information that is newly generated in response to submission of the comment by the user, a group of the tag information associated in the vicinity of the playback position may be automatically displayed in the tag detail display 2005 after the user submits the comment.

Figure 8:
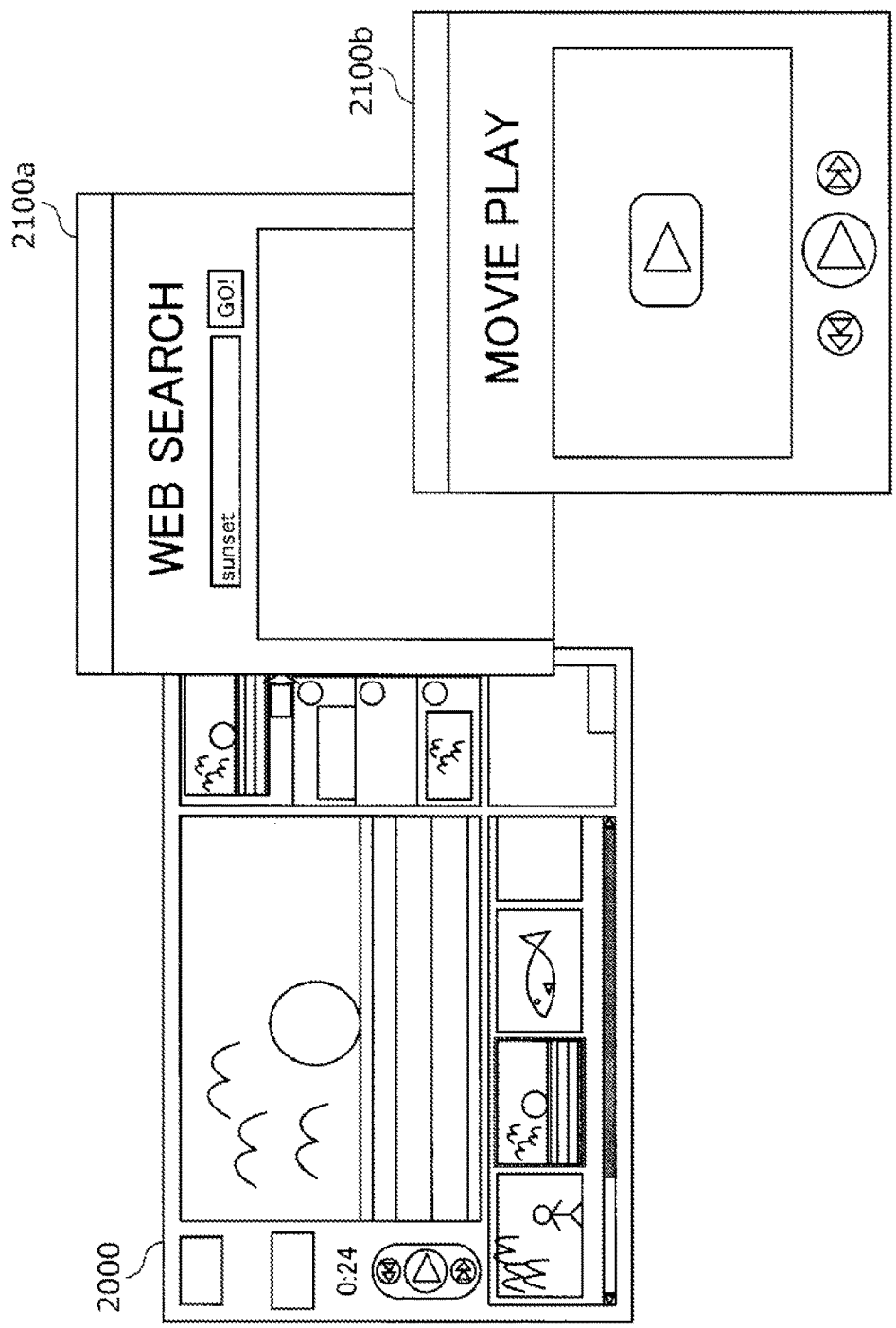
FIG. 8 illustrates an example of a link between a playback screen and other screens in Embodiment 1 of the present disclosure.

FIG. 8 illustrates an example of a link between a playback screen and other screens in Embodiment 1 of the present disclosure. As illustrated in FIG. 8, tag information generated by the tag generation unit 160 in the server 100 can be based on not only submission of comments but also, for example, results of web search using a web browser screen 2100*a* and playback of another content (video content) using a web browser screen 2100*b*. For such processing, for example, a web browser screen 2100 and the playback screen 2000 may be provided by a common service, or a plug-in for linking a service provided by the server 100 to the normal web browser screen 2100 may be added. Information input on the web browser screen 2100 provided as described above can be transmitted by the communication unit 210 of the client 200 to another server or the like via the server 100.

(Specification of Position on the Screen)

Figure 9:
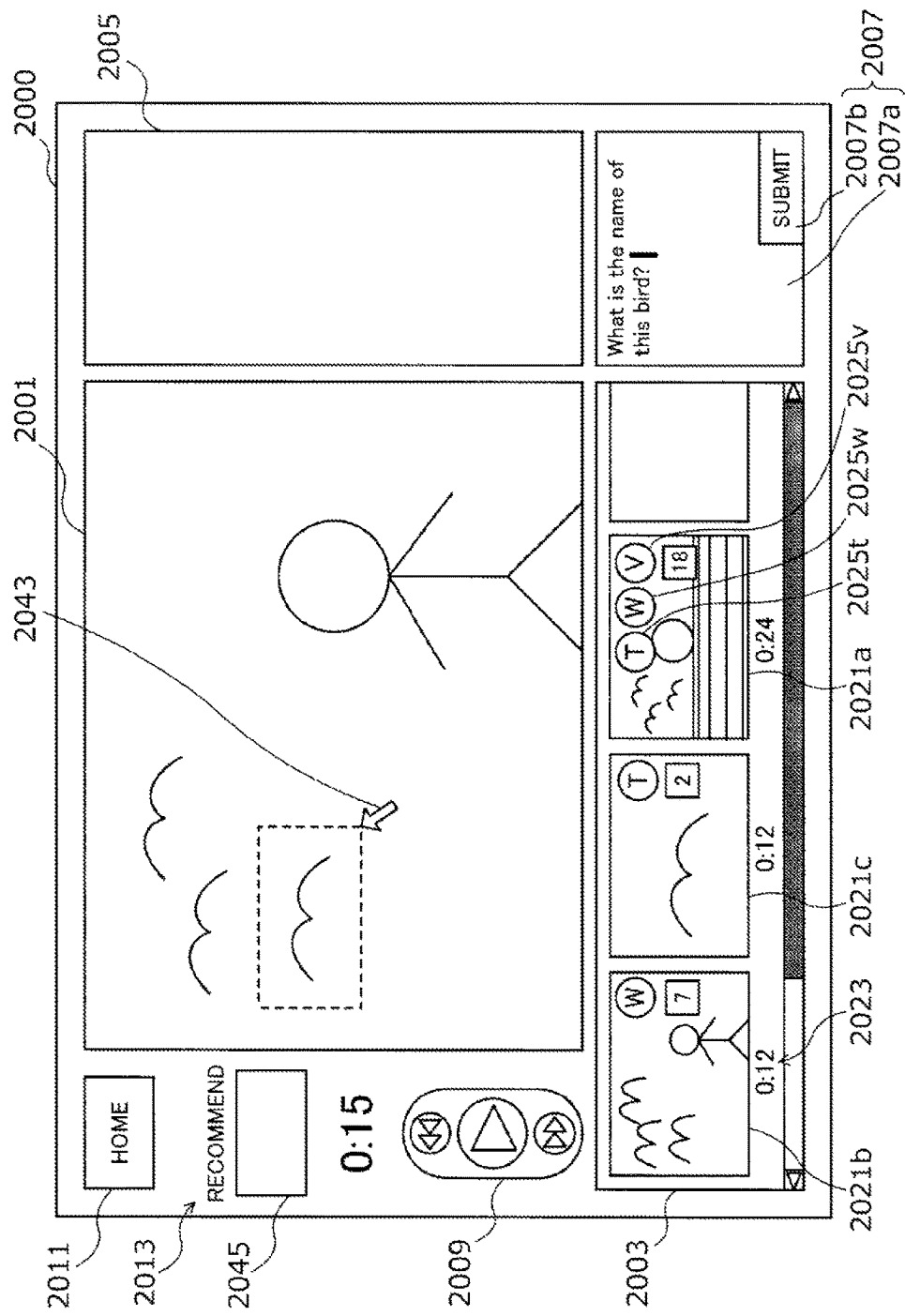
FIG. 9 illustrates a display example where a position on a screen is specified on a playback screen in Embodiment 1 of the present disclosure.

FIG. 9 illustrates a display example where a position on a screen is specified on a playback screen in Embodiment 1 of the present disclosure. When referring to FIG. 9, the user specifies a position in the content image 2001 on the screen with the use of a pointer 2043 on the playback screen 2000 and then inputs a comment with respect to the content in the comment input section 2007. In such a case, the activity detection unit 150 of the server 100 can detect submission of the comment by the user as an activity including specification of the position on the screen. Furthermore, the tag association unit 170 associates the tag information with not only a playback position of the content but also the position on the screen. Note that the position on the screen to be associated may also be defined as a range or a region or pieces of tag information associated in close positions on the screen may be grouped in the same way as the playback position.

Herein, the tag information associated with the position on the screen, tag information that is associated with another position on the screen in a close playback position, and tag information that is not associated with a position on the screen can be separately displayed in, for example, the tag list display 2003 and the tag detail display 2005. More specifically, as illustrated in FIG. 9 even in the case where the timestamps 2023 are the same ("0:12" in the example of FIG. 9), capture images 2021*b* and 2021*c* corresponding to pieces of tag information associated with different positions on the screen are separately displayed on the tag list display 2003. The capture image 2021*b* shows tag information associated with the whole screen, and the capture image 2021*c* shows a part of the screen, specifically, tag information associated with a region where a bird exists. The capture image 2021*c* showing the tag information associated with the part of the screen can be obtained by cutting out an image of a corresponding position on the screen or a part in the vicinity of the position from the capture image of the content. In the above case, pieces of tag information in close playback positions and close positions on the screen can be individually displayed also on the tag detail display 2005 in accordance with the tag list display 2003.

(Other Display Elements)

Referring back to FIG. 6, the playback control 2009 is a graphical user interface (GUI) component for controlling start and stop of playback of the content, movement of a playback position, and the like on the playback screen 2000. The home button 2011 is a button for interrupting or terminating viewing of the content to change the screen to the home screen 1000 described above. The recommendation information 2013 displays, for example, a curator followed by the user or recommendation of a content from another user in the same group as the user. For example, by selecting a thumbnail 2045 of a content displayed as the recommendation information 2013, the content displayed as the content image 2001 may be changed to the content displayed as the thumbnail 2045 and viewing of the content may be started.

Modification Example

Figure 10:
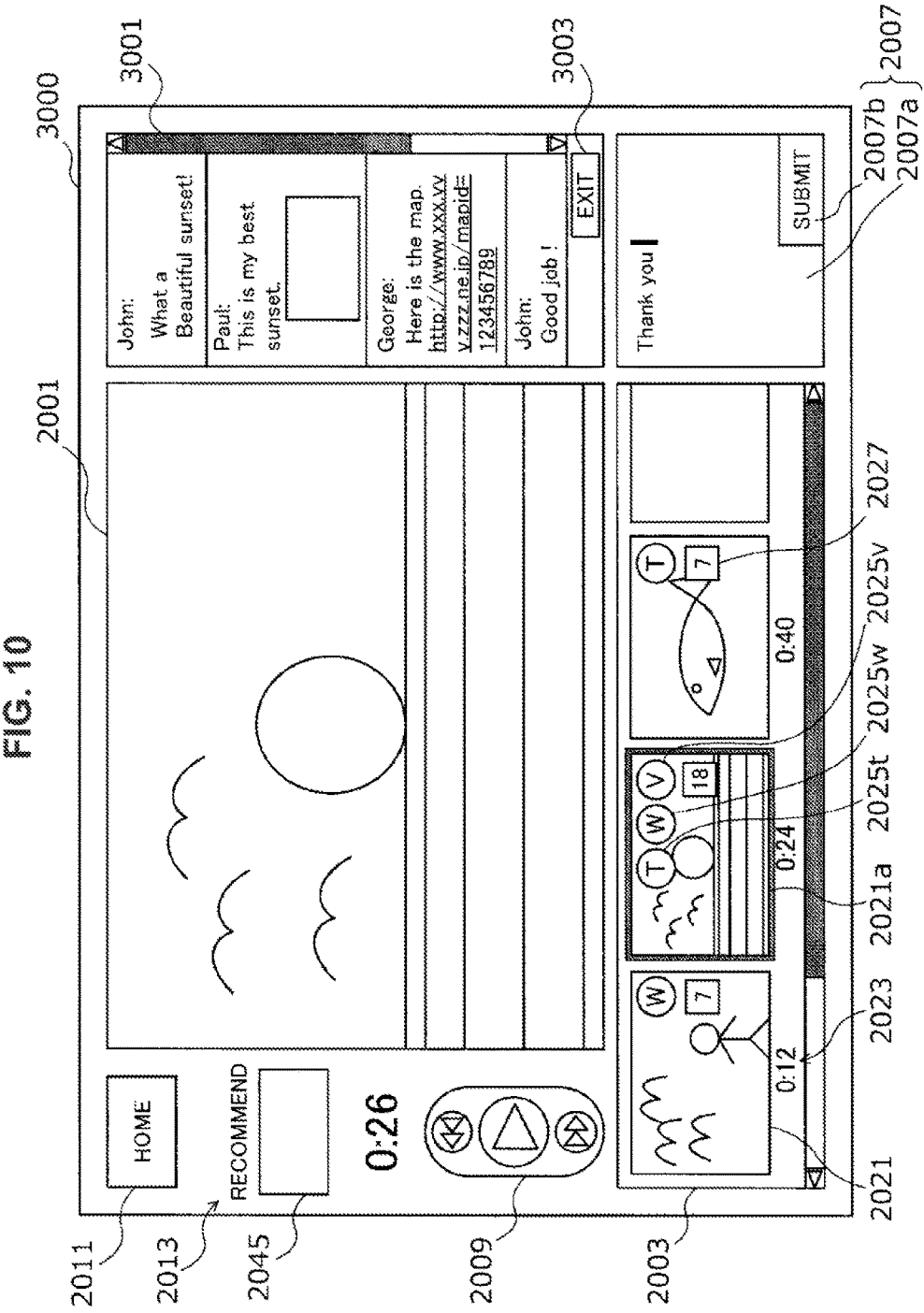
FIG. 10 illustrates a display example where a communication service is provided on a playback screen in Embodiment 1 of the present disclosure.

FIG. 10 illustrates a display example where a communication service is provided on a playback screen in Embodiment 1 of the present disclosure. When referring to FIG. 10, the content image 2001, the tag list display 2003, a chat screen 3001, the comment input section 2007, the playback control 2009, the home button 2011, and the recommendation information 2013 are displayed on a playback screen 3000. Note that the playback screen 3000 has similar elements to those of the above playback screen 2000 except for the chat screen 3001, and therefore detailed description thereof will be omitted.

In this embodiment, for example, in the case where the user submits a comment during playback of the content with the use of the comment input section 2007 by a function of the communication service provision unit 180 of the server 100 and new tag information is associated with a playback position of the content on the basis of the comment, the user can be invited to a chat room established for the user and another user who has input a comment in a playback position in the vicinity of the above playback position. The chat screen 3001 displays a log of statement of the users in this chat room. The user can submit statement in the chat room with the use of the comment input section 2007 as before. The chat screen 3001 may be displayed by, for example, changing display of the tag detail display 2005 that has been displayed until then. Alternatively, the chat screen 3001 may be displayed on the playback screen 3000 from the beginning and may be blank before the user inputs a comment with the use of the comment input section 2007.

In the above example, the first comment submitted by the user with the use of the comment input section 2007 may be displayed on the chat screen 3001 as the first statement of the user in the chat room. Further, a trigger for inviting the user to the chat room is not limited to submission of a comment and may be web search and playback of another content as illustrated in, for example, FIG. 8. In this case, results of web search or a link to another content may be displayed as the first statement of the user on the chat screen 3001. Alternatively, preview of the chat screen 3001 may be presented when the user executes an activity such as submission of a comment, and the chat screen may be displayed only when the user who has browsed the preview enters the chat room by choice.

As described above, statement of the users displayed on the chat screen 3001 is also detected as an activity by the activity detection unit 150 of the server 100 and tag information generated by the tag generation unit 160 can be based on the statement. Note that the statement of the users in the chat room can include, for example, information which is similar to that of an activity of a user who is viewing a normal content, such as links to a web page and another content.

The content displayed as the content image 2001 is played back by control of the playback control unit 120 of the server 100 so that a range including a target playback position is repeated while the chat screen 3001 is displayed on the playback screen 3000 after the user enters the chat room. The tag association unit 170 may associate tag information generated on the basis of statement of the users with a common playback position ("0:24" in the example of FIG. 9) in each chat room, regardless of the position where the statement is input within the repeated range. In the case where the user wants to continue viewing the content, the user can select an exit button 3003 to exit the chat room and view the normal content again.

According to Embodiment 1 of the present disclosure described above, by detecting an activity of the user who currently plays back the content and generating tag information on the basis of information on the detected activity, it is possible to collect a large amount of information as the tag information on the content without causing the user to feel troublesomeness to perform additional labor for inputting the tag information. Further, by associating the generated tag information with a playback position of the content and/or a position on the screen in the content, which corresponds to the activity, it is possible to clearly find which part in the content the tag information regards. Therefore, even in the case where the tag information is tag information collected at random by an activity of the user as described above, it is possible to easily read meaningful information therefrom.

2. Embodiment 2

Embodiment 2 of the present disclosure will be described with reference to FIG. 11 to FIG. 15. In this embodiment, tag information generated regarding a content is not necessarily associated with a playback position of the content. In this embodiment, the tag information is associated with one or plurality of positions in the content. Note that points other than the above point are similar to those in Embodiment 1, and therefore repeated description will be omitted by denoting elements with the common reference signs.

(2-1. Functional Configuration)

Figure 11:
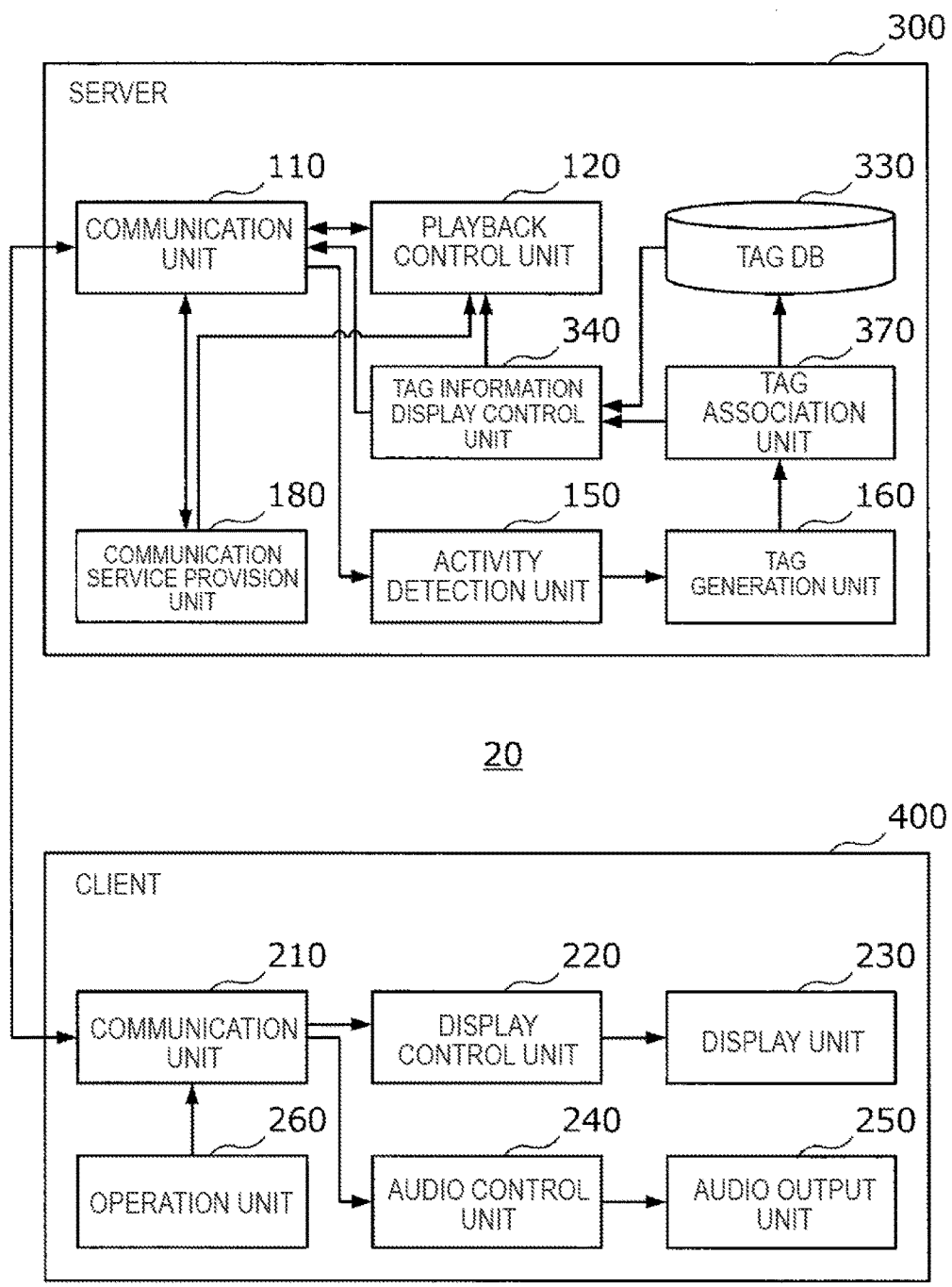
FIG. 11 is a block diagram showing a schematic functional configuration of devices according to Embodiment 2 of the present disclosure.

FIG. 11 is a block diagram showing a schematic functional configuration of devices according to Embodiment 2 of the present disclosure. When referring to FIG. 11, a system 20 according to this embodiment include a server 300 and a client 400. Both the server 300 and the client 400 are realized by a hardware configuration of the information processing apparatus described below and connected to each other via any one of various wired or wireless networks. Note that the server 300 does not need to be realized as a single information processing apparatus and may be realized by cooperation of a plurality of information processing apparatuses connected to one another via a network. Further, the functional configuration illustrated in FIG. 11 is simplified for describing this embodiment, and the devices may further include a functional configuration that is not illustrated in FIG. 11. The functional configuration that is not illustrated in FIG. 11 can be a functional configuration that has already been known as a general functional configuration of the devices, and therefore detailed description thereof will be omitted.

(Server)

The server 300 includes a communication unit 110, a playback control unit 120, a tag DB 330, a tag information display control unit 340, an activity detection unit 150, a tag generation unit 160, a tag association unit 370, and a communication service provision unit 180. Hereinafter, among them, the tag DB 330, the tag information display control unit 340, and the tag association unit 370, which are elements different from those in Embodiment 1 described above, will be particularly described.

(Tag DB)

The tag DB 330 is realized as, for example, a storage device and stores tag information generated regarding the content. The tag information is generated by, for example, the tag generation unit 160 and is associated with one or more positions in the content by the tag association unit 370, and is then stored in the tag DB 330. Further, the tag information may include information prepared as initial setting information. The tag information in this embodiment is similar to that in Embodiment 1 described above in that the tag information can include, for example, text, a link to a web page or another content, a thumbnail thereof, or the like. Note that this embodiment is different from Embodiment 1 in that the tag information only needs to be directly or indirectly associated with the one or more positions in the contents and does not need to be associated with a playback position of the content.

Herein, the terms "one or more positions in the content" and "playback position of the content" in this specification will be described again. The "content" in this specification can be, for example, a content that progresses with time such as a video and a musical composition. In this case, for example, it is possible to define a playback position of the content with the use of a timestamp (T) or the like. For example, association of tag information with one or more timestamps in a certain content can be association of the tag information with one or more positions in the content.

The "content" in this specification can be also a content displayed on a screen such as a video. In this case, for example, it is possible to define a position on the screen in the content with the use of a horizontal position (X), a vertical position (Y), and the like. For example, association of tag information with one or more positions in a certain content on the screen can be association of the tag information with one or more positions in the content.

Further, in the case where the content is displayed on the screen, the tag information may be associated with information on a subject. The subject is, for example, a person, an object, or the like displayed in a region on the screen (display region of subject) and is recognized as an image part having some meaning to a viewer. For example, in a content that progresses with time and is displayed on the screen, such as a video, a subject can be displayed in a series of timestamps (plurality of playback positions) while the display region is changed (display region is not changed in some cases). Therefore, it can be said that, for example, in the case where tag information is associated with information indicating a certain subject, the tag information is indirectly associated with display positions of the subject (a plurality of positions on the screen) in a series of timestamps (a plurality of playback positions) in each of which the display position of the subject exists in the content.

As described above, in this embodiment, it is possible to associate tag information with information indicating some meaning (e.g., subject) given to at least a part (at least a playback position and/or at least a position on the screen) of information included in the content. In this case, it can also be said that the tag information is indirectly associated with one or more positions indicating a part(s) to which the meaning is given in the content. Such information indicating some meaning can also be referred to as a category of tag information in this specification. Therefore, in this embodiment, the tag information stored in the tag DB 330 is associated with one or more positions in the content, and, more specifically, the tag information is associated with, for example, one or more of a playback position, a position on the screen, and a category.

(Tag Information Display Control Unit)

The tag information display control unit 340 is realized by, for example, the processor such as the CPU operating in accordance with a program stored in the memory and displays tag information read from the tag DB 330 on the playback screen of the content. Display of the tag information on the playback screen of the content can be, for example, similar to that in Embodiment 1. Alternatively, the tag information can also be associated with, for example, a category in this embodiment as described above, and therefore, for example, the tag information display control unit 340 may display tag information associated in a common category as a group.

The tag information display control unit 340 displays, on the playback screen of the content, tag category information indicating a category with which tag information to be newly generated is associated before the tag information is generated or registered. For example, in the case where a position on the screen in the content is specified by an activity of the user, the tag information display control unit 340 can display information (e.g., information on subject) associated with tag information generated on the basis of a series of activities including the activity in advance. For example, the tag information display control unit 340 displays, as the tag category information, information on the subject displayed in a region positioning in the vicinity of the position on the screen. In the case where tag information has already been associated with the subject, the tag information display control unit 340 may display those pieces of tag information as the tag category information. Note that a specific example of display of the tag category information by the tag information display control unit 340 will be described below.

(Tag Association Unit)

The tag association unit 370 is realized by, for example, the processor such as the CPU operating in accordance with a program stored in the memory and directly or indirectly associates tag information generated by the tag generation unit 160 with one or more positions in the content, the one or more positions corresponding to an activity based on which the tag information is generated. The tag information associated with the content by the tag association unit 370 may be stored in, for example, the tag DB 330 or may be provided to the tag information display control unit 340 and be displayed in real time in the client 400. Herein, processing of the tag association unit 370 for associating tag information with a playback position and a position on the screen can be, for example, similar to that of the tag association unit 170 in Embodiment 1 described above.

Furthermore, the tag association unit 370 may indirectly associate tag information with one or more positions in the content by associating the tag information with a category. For example, the tag association unit 370 may detect a subject displayed in the vicinity of a position on the screen clearly specified in an activity by the user and associate tag information with the detected subject. Herein, in the case where the tag information display control unit 340 displays the information on the detected subject or the like as the tag category information on the playback screen of the content, the tag association unit 370 may determine information to be associated with the tag information on the basis of an activity that is further executed by the user in response to the tag category information. For example, in the case where the user refers to the tag category information and subsequently executes an activity such as submission of a comment, the tag association unit 370 associates tag information with information displayed as the tag category information. In the case where, for example, the user executes an activity including correction of the tag category information, the tag association unit 370 corrects the information displayed as the tag category information in accordance with the activity and then associates the information with the tag information.

(2-2. Screen Display Example)
(Playback Screen)

FIG. 12 and FIG. 13 illustrate display examples of a playback screen in Embodiment 2 of the present disclosure. In the case where, for example, the user starts the application for viewing a content in the client 200 and selects a content to be viewed via the home screen 1000 or the like similar to that described in Embodiment 1, a playback screen 4000 in this embodiment can be displayed on the display unit 230 by control of the display control unit 220.

When referring to FIG. 12 and FIG. 13, the content image 2001, the tag list display 2003, tag category information 4005, the comment input section 2007, the playback control 2009, the home button 2011, the recommendation information 2013, and a pointer 4015 are displayed on the playback screen 4000. Hereinafter, among them, the tag category information 4005 and the pointer 4015, which are elements different from those in Embodiment 1, will be particularly described.

In the case where, for example, the user executes an activity to specify a position in the content image 2001 (position on the screen) with the use of the pointer 4015, the tag category information 4005 presents in advance information on a category to be associated with tag information that can be generated on the basis of the next activity of the user. For example, as illustrated in FIG. 12, in the case where the user specifies a certain position P in the content image 2001 with the use of the pointer 4015, the tag information display control unit 340 may search a subject displayed in a region positioning in the vicinity of the position P (or region including the position P) and may display, as the tag category information 4005, information on the subject found as a result of the search. At this time, in the case where tag information that has already been associated with the subject is stored in the tag DB 330, the tag information display control unit 340 may display those pieces of tag information as tag information display 4029 in the tag category information 4005.

In the above example, in the case where no subject displayed in the vicinity of the position P is found, the tag information display control unit 340 may specify a region having a predetermined size based on the position P (e.g., a rectangular region centering around the position P) as a region instead of the display region of the subject and may display information indicating this region as the tag category information 4005. At this time, in the case where the tag information that has already been associated with the region is stored in the tag DB 330, the tag information display control unit 340 may display those pieces of tag information as the tag information display 4029 in the tag category information 4005. Thus, although existence of the subject is not detected depending on image recognition processing or the like, generation of tag information that is not necessarily associated with the subject is useful, for example, in the case where an object having some meaning to the user is displayed or in the case where the user submits a comment regarding background (townscape, landscape, and the like) of the content image 2001 (tag information is generated on the basis of the comment).

Further, in the case where, for example, the user executes an activity to specify a region in the content image 2001 with the use of the pointer 4015 (a position on the screen in the content can be defined as a range or a region as described above), the tag category information 4005 may present information to be associated with tag information that can be generated on the basis of the next activity of the user. For example, as illustrated in FIG. 13, in the case where the user specifies a region Q in the content image 2001 with the use of the pointer 4015, the tag information display control unit 340 searches a subject displayed in a region included in the region Q (the region may be partially overlapped with the region Q) and displays, as the tag category information 4005, information on the subject found as a result of the search. At this time, in the case where tag information that has already been associated with the subject is stored in the tag DB 330, the tag information display control unit 340 may display those pieces of tag information as the tag information display 4029 in the tag category information 4005. Meanwhile, in the case where no subject displayed in the region included in the region Q is found, the tag information display control unit 340 may specify a region having a predetermined size based on the region Q (the region may be the region Q itself) as a region instead of the display region of the subject and may display information indicating this region as the tag category information 4005 as in the example of FIG. 12.

(Tag Category Information Display)

FIG. 14 illustrates an example of tag category information display in Embodiment 2 of the present disclosure. As described above with reference to FIG. 12 and FIG. 13, in this embodiment, the tag category information 4005 that presents information associated with tag information generated on the basis of an activity of the user is displayed on the playback screen 4000. In the above description, a subject displayed in the vicinity of a position or a region in the content image 2001 specified by an activity of the user is searched and information on the subject found as a result of the search is displayed as the tag category information 4005.

However, actually, for example, a subject detected by image recognition processing or the like is not always recognized as a specific person or object. Therefore, in some cases, the subject is recognized as a subject, a person, or an object but is unidentified in terms of what the subject is or who the subject is. Hereinafter, a display example of the tag category information 4005 for such a case will be described.

It is assumed that the position P is specified by an activity of the user in a content image 2001a including some subject (S301). At this time, not only information on a timestamp (T) and a horizontal position and a vertical position (X, Y) of the position P in the content but also information indicating an image around the position P can be transmitted to the server 300 from the communication unit 210 of the client 400 (S303). The information indicating the image around the position P may be, for example, image data obtained by cutting out a region having a predetermined size based on the position P from the content image 2001 or may be data based on a feature value extracted from the image data.

The tag information display control unit 340 of the server 300 that has received the above information searches a subject displayed in a region around the position P (S305). More specifically, for example, the tag information display control unit 340 may search the subject around the position P with which the tag information has already been associated on the basis of the information on the timestamp (T) and the horizontal position and the vertical position (X, Y) of the position P in the content. In the case where detection of subjects has already been executed over the whole content, the tag information display control unit 340 may refer to results of the detection of the subjects.

Meanwhile, in the case where there is no subject around the position P with which the tag information has already been associated and the detection of the subject has not been executed yet, the tag information display control unit 340 searches the subject on the basis of the information indicating the image around the position P received from the client 400. For example, the tag information display control unit 340 executes image recognition processing with the use of the image data cut out from the content 2001 or the data based on the feature value extracted from the image data, thereby detecting the subject.

In the case where the subject is found by the above processing and the subject is recognized, the tag information display control unit 340 displays information indicating the subject as the tag category information 4005 in the client 400. Meanwhile, in the case where the subject is found but is not specified in terms of what the subject is or who the subject is, the tag information display control unit 340 displays information indicating that the subject has been unidentified as tag category information 4005a in the client 400 (S307).

In the example illustrated in FIG. 14, the subject is recognized as a person but is not specified in terms of who the subject is, and therefore the tag category information 4005a is displayed together with a title 4017a "Who is This?" indicating that the subject is an unidentified person. The title 4017a can be displayed so as to be rewritable by the user. In the case where the user knows who the subject is, the user can rewrite the title 4017a, i.e., can input the person's name and then submit a comment (S309).

The tag information is generated in the server 300 on the basis of submission of the comment, and the generated tag information is associated with the subject (S311). At this time, the tag association unit 370 can register the subject associated with the tag information in association with the subject's name input by the user and the information indicating the image around the position P that has previously been received from the client 400. With this, from then, in the case where a position on the screen including a similar image in the content is specified, the tag information display control unit 340 can display information on the registered subject as the tag category information 4005.

In the case where the subject's name is set on the basis of input of the user as described above, there is a possibility that different names of the subject are input by the user. Further, for example, in some cases, it is determined that setting the subject's name on the basis of input of a single user has low reliability. In such a case, the tag information display control unit 340 displays information indicating that the registered subject's name is not sufficiently reliable as tag category information 4005b in the client 400 (S313).

In the example illustrated in FIG. 14, the tag category information 4005b can include a title 4017b in which "?" is added to indicate that the current registered subject's name is unreliable. In this case, the title 4017b can be displayed so as to be rewritable by a user (e.g., another user who is different from the user who has previously registered the subject's name). In the case where the user knows that the subject is not a person having the current registered subject's name, the user can rewrite the title 4017b, i.e., can input a person's name and then submit a comment (S315). As another example, the user may select a subject's name that the user considers as a correct name from candidates of a plurality of names of the subject which are displayed as the title 4017b and then submit a comment.

The tag association unit 370 (or the tag information display control unit 340) generates tag information on the basis of submission of the comment and associates the tag information with the subject. In addition, for example, the tag association unit 370 (or the tag information display control unit 340) determines reliability and presence/absence of an alternative idea of the registered subject's name on the basis of, for example, accumulation of correction input of the subject's name described above and corrects the subject's name as necessary (S317). By such processing, the relatively correct subject's name is ascertained, and the tag information display control unit 340 displays information indicating that reliability of the registered subject's name is relatively high as tag category information 4005c in the client 400 (S319).

In the example illustrated in FIG. 14, the tag category information 4005c can include a title 4017c in which the current registered subject's name is displayed without "?". The title 4017c can be displayed so as not to be easily rewritable by the user. However, means for presenting doubt may be provided also for the title 4017c. For example, the tag category information 4005c includes a doubt button 4019, and, in the case where the user considers that the subject's name displayed as the title 4017c is wrong, the user may push the doubt button 4019 to input a subject's name that the user considers as a correct name and then submit a comment (S321). In this case, for example, the subject's name input with the use of the doubt button 4019 is accumulated by the tag association unit 370 (or the tag information display control unit 340), and, in the case where similar correction propositions are accumulated to a certain extent, the subject's name is changed, or the subject's name is returned to an undetermined state, which is similar to a case where the tag category information 4005b is displayed.

(2-3. Processing flow)

FIG. 15 is a flowchart showing an example of a display process of tag category information display in Embodiment 2 of the present disclosure.

First, in the server 300, the activity detection unit 150 acquires an activity to specify a position P in the content image 2001, the activity being performed by a user who is viewing a content in the client 400 (S401). Herein, the information acquired by the activity detection unit 150 can include, for example, not only information on a timestamp (T) and a horizontal position and a vertical position (X, Y) in the position P of the content but also information indicating an image around the position P. The tag information display control unit 340 searches tag information stored in the tag DB 330 with the use of the above information (S403). More specifically, the tag information display control unit 340 searches tag information associated with a display region of a subject or a region in the image positioning in the vicinity of the timestamp (T) and the horizontal position and the vertical position (X, Y) within a predetermined range.

In the case where the corresponding tag information is found (YES in S405) as a result of the search, the tag information display control unit 340 generates the tag information display 4029 on the basis of the found tag information (S407). Further, the tag information display control unit 340 generates a title 4017 on the basis of a subject's name associated with the found tag information (S409). The tag information display control unit 340 displays the tag category information 4005 including the tag information display 4029 and the title 4017 on the playback screen 4000 displayed in the client 400 (S411).

On the contrary, in the case where the corresponding tag information is not found (NO in S405) as a result of the search, the tag information display control unit 340 executes image recognition processing on the basis of the information indicating image around the position P acquired by the activity detection unit 150 (S413). Herein, in the case where the subject is recognized as a person as a result of the image recognition processing (YES in S415), the tag information display control unit 340 searches tag information associated with the recognized person in the tag DB 330 (S417). The search in S417 is different from that in S403 in that the subject (person) associated with the tag information is used as a condition for search, and therefore those pieces of tag information do not necessarily have a common timestamp (T) or common horizontal and vertical positions (X, Y). For example, by such processing, in this embodiment, the tag information can be associated with a plurality of playback positions and a plurality of positions on the screen in the content via the subject.

In the case where the corresponding tag information is found (YES in S419) as a result of the search in S417, the tag information display control unit 340 generates the tag information display 4029 on the basis of the found tag information (S407). Further, the tag information display control unit 340 generates a title 4017 on the basis of a subject's (person's) name associated with the found tag information (S409). The tag information display control unit 340 displays the tag category information 4005 including the tag information display 4029 and the title 4017 on the playback screen 4000 displayed in the client 400 (S411).

Meanwhile, in the case where no corresponding tag information is found (NO in S419) as a result of the search in S417, the tag information display control unit 340 generates the title 4017 on the basis of the subject's (person's) name (S409). Note that, in the case where the subject's (person's) name is unclear, the tag information display control unit 340 generates the title 4017 such as "Who is this?" as illustrated in the example of FIG. 14. The tag information display control unit 340 displays the tag category information 4005 including the title 4017 on the playback screen 4000 displayed in the client 400 (S411). In this case, tag information that is newly generated on the basis of the next activity (submission of comment) of the user is dealt as the first tag information associated with the subject (person) in the content.

In the case where the subject is not a person (NO in S415) and is recognized as an object other than a person (YES in S421) as a result of the image recognition processing, the tag information display control unit 340 searches tag information associated with the recognized object in the tag DB 330 (S417). The processing in and after S417 is performed in the same way as the case where the subject is a person (in the case where the subject's (object's) name is unclear, for example, the title 4017 such as "What is this?" can be generated).

Meanwhile, in the case where the subject is also not recognized as an object (NO in S421) as a result of the image recognition processing, the tag information display control unit 340 specifies a region having a predetermined size based on the position P as a region to be associated with tag information and displays the tag category information 4005 including information on this region (S423). In this case, there is a possibility that no subject is detected by the image recognition processing but a subject is actually displayed in the region, and therefore the tag information display control unit 140 may display a character string such as "What is this?" as the title 4017 of the tag category information 4005.

According to Embodiment 2 of the present disclosure described above, tag information generated on the basis of an activity of the user who currently plays back the content is not simply associated with a playback position of the content and/or a position on the screen in the content but is associated with, for example, information on a category such as a subject of the content and is therefore indirectly associated with a plurality of playback positions of the content and a plurality of positions in the content on the screen. With this, the tag information can be associated with a series of parts having some meaning to the user in the content, and therefore it is possible to easily read meaningful information from the tag information.

Note that, although the category such as a subject is set in the content in the above example, the category may be set across contents. For example, tag information associated with a subject that is common to a certain content and another content may be mutually referred to. In this case, for example, in the case where no tag information that has already been associated with a certain subject in a content exists when the tag information display 4029 is displayed, tag information of another content may be displayed.

3. Embodiment 3

Embodiment 3 of the present disclosure will be described with reference to FIG. 16. In this embodiment, functions of the activity detection unit, the tag generation unit, and the tag association unit, which are realized in the server in Embodiment 1 or 2 described above, are realized in a client. Note that detailed description of each function is similar to that in Embodiment 1 or 2, and therefore repeated description will be omitted by denoting elements with the corresponding reference signs. Note that, although the following description is based on the configuration of Embodiment 1, the configuration of Embodiment 2 can also be similarly modified.

FIG. 16 is a block diagram showing a schematic functional configuration of devices according to Embodiment 2 of the present disclosure. When referring to FIG. 16, a system 30 according to this embodiment include a server 500 and a client 600. Both the server 500 and the client 600 are realized by a hardware configuration of the information processing apparatus described below and connected to each other via any one of various wired or wireless networks. Note that the server 500 does not need to be realized as a single information processing apparatus and may be realized by cooperation of a plurality of information processing apparatuses connected to one another via a network. Further, the functional configuration illustrated in FIG. 16 is simplified for describing this embodiment, and the devices may further include a functional configuration that is not illustrated in FIG. 16. The functional configuration that is not illustrated in FIG. 16 can be a functional configuration that has already been known as a general functional configuration of the devices, and therefore detailed description thereof will be omitted.

A server 500 includes a communication unit 110, a tag DB 130, and a communication service provision unit 180. In this embodiment, the server 500 realizes, for example, a function of providing, to a client 600, a content acquired from a contents provider 50 of a video distribution server or the like together with tag information read from the tag DB 130 in response to a request from the client 600 and a function of storing, in the tag DB 130, new tag information on the content provided from the client 600. That is, the server 500 gathers tag information generated in each client 600. Further, the server 500 may provide a communication service to a plurality of users who have provided tag information associated with close playback positions (and/or close positions on the screen) in the same content by a function of the communication service provision unit 180.

The client 600 includes not only a communication unit 210, a display control unit 220, a display unit 230, an audio control unit 240, an audio output unit 250, and an operation unit 260 but also a playback control unit 120, a tag information display control unit 140, an activity detection unit 150, a tag generation unit 160, and a tag association unit 170. The client 600 detects an activity of a user who currently plays back a content, generates tag information on the basis of information on the activity, and associates tag information with the content independently from the server 500. With this configuration of this embodiment, for example, even in the case where the client 600 cannot stably communicate with the server 500 during playback of the content, it is possible to generate tag information based on an activity of the user and associate the tag information.

More specifically, the playback control unit 120 controls playback of content data acquired by the communication unit 110. Because the playback control unit 120 is provided in the client 600 in this embodiment, the playback control unit 120 can control the display control unit 220 and the audio control unit 240. The tag information display control unit 140 displays tag information, which is read out from the tag DB 130 in the server 500 and is transmitted to the communication unit 210 of the client 600 from the communication unit 110, on a playback screen of a corresponding content. Because the tag information display control unit 140 is provided in the client 600 in this embodiment, the tag information display control unit 140 can control the display control unit 220. The activity detection unit 150 intercepts information that is transmitted to the server 500 from the communication unit 210 and information received by the communication unit 210 from the server 500 or the like in response to operation input acquired by the operation unit 260 and detects an activity of the user on the basis of the above information. Note that, as indicated by a broken line in FIG. 16, the activity detection unit 150 may directly acquire information on operation input of the user from the operation unit 260. The tag association unit 170 transmits tag information that is generated by the tag generation unit 160 and is associated with the content to the server 500 from the communication unit 210. In the server 500, the received tag information is stored in the tag DB 130.

As described above, in Embodiment 3 of the present disclosure, functions similar to those of Embodiment 1 or 2 are realized in a different way from that in Embodiment 1 or 2, i.e., the functions are dispersively realized by the server and the client. Thus, in the embodiments of the present disclosure, it is possible to freely set whether each function is realized by the server or the client. Therefore, in the present disclosure, it is possible to achieve, in addition to the embodiments described above, various types of embodiments in which the functions are dispersively realized by the server and the client in further different ways.

4. Hardware Configuration

Next, with reference to FIG. 17, a hardware configuration of an information processing apparatus according to an embodiment of the present disclosure will be described. FIG. 17 is a block diagram showing a hardware configuration of an information processing apparatus. An information processing apparatus 900 shown in FIG. 17 may achieve the servers and the clients in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. The information processing apparatus 900 may also include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like at the time of the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, or a switch. The input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various types of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD) or an organic electro-luminescence (EL) display; or an audio output device such as a speaker or headphones. The output device 917 outputs results of the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI, a registered trademark) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

5. Supplement

The embodiments of the present disclosure may include the information processing apparatus, the system, the information processing method executed in the information processing apparatus or the system, the program for causing the information processing apparatus to function, and the non-transitory tangible media having the program recorded thereon, which have been described above, for example.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing apparatus including:
an activity detection unit configured to detect an activity of a user who currently plays back a content;
a tag generation unit configured to generate tag information on the basis of information on the activity; and
a tag association unit configured to associate the tag information with one or more positions in the content, the one or more positions corresponding to the activity.

(2)

The information processing apparatus according to (1),
wherein the activity detection unit detects that the user has submitted a comment, and
wherein the tag generation unit generates the tag information on the basis of text included in the comment.

(3)

The information processing apparatus according to (2),
the activity detection unit detects that the user has submitted a comment to social media.

(4)

The information processing apparatus according to (1),
wherein the activity detection unit detects that the user has accessed information other than the content, and
wherein the tag generation unit generates the tag information on the basis of the accessed information.

(5)

The information processing apparatus according to (4),
wherein the tag generation unit generates the tag information including a link to the accessed information.

(6)

The information processing apparatus according to any one of (1) to (5), further including:
a communication service provision unit configured to provide a communication service to a plurality of users who have executed activities corresponding to a plurality of pieces of tag information associated with a common position in the content.

(7)

The information processing apparatus according to (6),
wherein the tag association unit associates the plurality of pieces of tag information with one or more playback positions in the content that progresses with time, and
wherein the information processing apparatus further includes a playback control unit configured to play back the content in a manner that a range including the one or more playback positions is repeated while the user uses the communication service.

(8)

The information processing apparatus according to (6) or (7),
wherein the activity detection unit detects statement of the user in the communication service, and
wherein the tag generation unit further generates the tag information on the basis of text included in the statement.

(9)

The information processing apparatus according to any one of (1) to (8),
wherein the content is a video content, and
wherein the tag association unit associates the tag information with a position on a screen in the video content.

(10)

The information processing apparatus according to (9),
the activity detection unit detects the activity including specification of the position on the screen.

(11)

The information processing apparatus according to (9),
wherein the tag association unit associates the tag information with information on a region corresponding to the position on the screen.

(12)
The information processing apparatus according to (11), wherein the region includes a display region of a subject, and
wherein the tag association unit associates the tag information with information on the subject.

(13)
The information processing apparatus according to (12), further including:
a tag information display control unit configured to display in advance the information on the subject with which the tag information is associated on a playback screen of the content,
wherein the tag association unit determines information to be associated with the tag information on the basis of an activity that is further executed by the user in response to the information displayed in advance by the tag information display control unit.

(14)
The information processing apparatus according to (13), wherein the tag information display control unit determines the information on the subject with which the tag information is associated on the basis of information on the subject associated with another tag information associated with a position close to the one or more positions in the content, the one or more positions corresponding to the activity.

(15)
The information processing apparatus according to (13), wherein the tag information display control unit determines the information on the subject with which the tag information is associated on the basis of information extracted from an image of the region.

(16)
The information processing apparatus according to any one of (13) to (15),
wherein the tag association unit corrects the information on the subject with which the tag information is associated on the basis of the activity that is further executed by the user in response to the information displayed in advance by the tag information display control unit.

(17)
The information processing apparatus according to any one of (1) to (16),
wherein the tag association unit associates the tag information with one or more playback positions in a video content that progresses with time, and
wherein the information processing apparatus further includes a tag information display control unit configured to display the tag information on a playback screen of the video content by using one or more capture images of the video content in the one or more playback positions.

(18)
The information processing apparatus according to (17), wherein the tag information display control unit further displays the tag information on the playback screen by using an icon indicating a type of information included in the tag information.

(19)
The information processing apparatus according to (17) or (18), further including:
a playback control unit configured to, in a case where the tag information displayed on the playback screen is selected, cause playback of the video content to jump to a playback position corresponding to the selected tag information.

(20)
An information processing method including:
detecting an activity of a user who currently plays back a content;
generating tag information on the basis of information on the activity; and
associating the tag information with one or more positions in the content, the one or more positions corresponding to the activity.

REFERENCE SIGNS LIST

10, 20 system
100, 500 server
110 communication unit
120 playback control unit
130 tag DB
140 tag information display control unit
150 activity detection unit
160 generation unit
170 tag association unit
180 communication service provision unit
200, 600 client
210 communication unit
220 display control unit
230 display unit
240 audio control unit
250 audio output unit
260 operation unit

The invention claimed is:
1. An information processing apparatus comprising:
an activity detection circuitry configured to detect an activity of a user who currently plays back a video content;
a tag generation circuitry configured to generate tag information on the basis of information on the activity;
a tag association circuitry configured to associate the tag information with one or more positions on a screen in the video content, the one or more positions corresponding to the activity,
wherein the tag association circuitry associates the tag information with information on a region corresponding to the positions on the screen, wherein the region includes a display region recognized as a subject and associates the tag information with information on the subject;
a tag information display control circuitry configured to display the information on the subject as rewritable information which indicates that the subject has not been identified, and
rewrite, by the user, the rewritable information as a name for the subject and input a comment,
wherein the tag association circuitry determines information to be associated with the tag information on the basis of the name, wherein the name is determined to be not sufficient,
corrects the name of the subject with which the tag information is associated, and displays the corrected name,
wherein the tag association circuitry generates the tag information on the basis of the inputted comment and corrected name and associates the tag information with the subject, a communication service provision circuitry configured to provide a communication service to a plurality of users who have executed activities corresponding to a plurality of pieces of tag information associated with a common position in the content.

2. The information processing apparatus according to claim 1, wherein the activity detection circuitry detects that the user has submitted a comment, and wherein the tag generation circuitry generates the tag information on the basis of text included in the comment.

3. The information processing apparatus according to claim 2, the activity detection circuitry detects that the user has submitted a comment to social media.

4. The information processing apparatus according to claim 1, wherein the activity detection circuitry detects that the user has accessed information other than the content, and wherein the tag generation circuitry generates the tag information on the basis of the accessed information.

5. The information processing apparatus according to claim 4, wherein the tag generation circuitry generates the tag information including a link to the accessed information.

6. The information processing apparatus according to claim 1, wherein the tag association circuitry associates the plurality of pieces of tag information with one or more playback positions in the content that progresses with time, and wherein the information processing apparatus further includes a playback control circuitry configured to play back the content in a manner that a range including the one or more playback positions is repeated while the user uses the communication service.

7. The information processing apparatus according to claim 1, wherein the activity detection circuitry detects statement of the user in the communication service, and wherein the tag generation circuitry further generates the tag information on the basis of text included in the statement.

8. The information processing apparatus according to the activity detection circuitry detects the activity including specification of the position on the screen.

9. The information processing apparatus according to claim 1, wherein the tag information display control circuitry determines the information on the subject with which the tag information is associated on the basis of information on the subject associated with another tag information associated with a position close to the one or more positions in the content, the one or more positions corresponding to the activity.

10. The information processing apparatus according to claim 1, wherein the tag information display control circuitry determines the information on the subject with which the tag information is associated on the basis of information extracted from an image of the region.

11. The information processing apparatus according to claim 1, wherein the tag association circuitry associates the tag information with one or more playback positions in a video content that progresses with time, and wherein the information processing apparatus further includes a tag information display control circuitry configured to display the tag information on a playback screen of the video content by using one or more capture images of the video content in the one or more playback positions.

12. The information processing apparatus according to claim 11, wherein the tag information display control circuitry further displays the tag information on the playback screen by using an icon indicating a type of information included in the tag information.

13. The information processing apparatus according to claim 11, further comprising: a playback control circuitry configured to, in a case where the tag information displayed on the playback screen is selected, cause playback of the video content to jump to a playback position corresponding to the selected tag information.

14. An information processing method comprising:
detecting an activity of a user who currently plays back a content;
generating tag information on the basis of information on the activity; and
associating the tag information with one or more positions on a screen in the content, the one or more positions corresponding to the activity;
associating the tag information with information on a region corresponding to the positions on the screen, wherein the region includes a display region recognized as a subject;
associating the tag information with information on the subject;
displaying the information on the subject as rewritable information which indicates that the subject has not been identified;
rewriting, by the user, the rewritable information as a name for the subject and inputting a comment;
determining information to be associated with the tag information on the basis of the name, wherein the name is determined to be not sufficient;
correcting the name of the subject with which the tag information is associated;
displaying the corrected name; and
generating the tag information on the basis of the inputted comment and corrected name and
associating the tag information with the subject; and
providing a communication service to a plurality of users who have executed activities corresponding to a plurality of pieces of tag information associated with a common position in the content.

15. The information processing apparatus according to claim 1, wherein the tag association circuitry displays the corrected name as a rewritable name with an indication that the corrected name is unreliable, wherein the tag information display control circuitry is configured to rewrite, by the user, the rewritable name as a reliable name for the subject, and wherein the tag information display control circuitry displays information indicating that the reliable name of the subject is reliable.

* * * * *